(12) United States Patent
Duggan

(10) Patent No.: US 8,571,145 B2
(45) Date of Patent: Oct. 29, 2013

(54) SYSTEM AND METHOD FOR MIMO DECODING

(75) Inventor: Jason Robert Duggan, Kanata (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 13/613,882

(22) Filed: Sep. 13, 2012

(65) Prior Publication Data

US 2013/0010900 A1 Jan. 10, 2013

Related U.S. Application Data

(63) Continuation of application No. 12/574,734, filed on Oct. 7, 2009, now Pat. No. 8,300,737.

(51) Int. Cl.
*H04L 27/06* (2006.01)

(52) U.S. Cl.
USPC .......................................................... 375/340

(58) Field of Classification Search
USPC .......................................................... 375/340
See application file for complete search history.

(56) References Cited

U.S. PATENT DOCUMENTS

| | | | |
|---|---|---|---|
| 2006/0256888 A1* | 11/2006 | Nissani (Nissensohn) | ... 375/267 |
| 2007/0250522 A1 | 10/2007 | Perrizo | |
| 2010/0205181 A1* | 8/2010 | Chidlovskii | ................. 707/741 |

OTHER PUBLICATIONS

European Patent Office, "Communication Pursuant to Article 94(3) EPC" for corresponding European Patent Application No. 09 172 394.0, dated Nov. 22, 2012, Netherlands.

Hanna Moore Curley, "Response to Communication Pursuant to Article 94(3) EPC" for corresponding European Patent Application No. 09 172 394.0, dated Dec. 20, 2012, Ireland.

Canadian Intellectual Property Office, "International Search Report" for corresponding International Patent Application No. PCT/CA2010/001621, dated Jan. 9, 2011, Canada.

Canadian Intellectual Property Office, "Written Opinion" for corresponding International Patent Application No. PCT/CA2010/001621, dated Dec. 22, 2010, Canada.

European Patent Office, "Extended European Search Report" for corresponding European Patent Application No. 09172394, dated Apr. 6, 2010, Netherlands.

H. Vikalo et al., On the Sphere-Decoding Algorithm II. Generalizations, Second-Order Statistics, and Applications to Communications, IEE Transactions on Signal Processing, vol. 53, No. 8, p. 2819-2834, 2005.

M.O. Damen et al., "On Maximum-Likelihood Detection and the Search for the Closest Lattice Point", IEEE Transactions on Information Theory, vol. 49, No. 10, p. 2389-2402, 2003.

(Continued)

*Primary Examiner* — Jaison Joseph
(74) *Attorney, Agent, or Firm* — Norton Rose Fulbright Canada LLP

(57) ABSTRACT

A method, a system, a wireless device and a computer program product are provided. A process for decoding transmitted symbols in MIMO systems is provided. The received point coordinates and estimated candidate coordinates are represented by a reduced bit representation naturally dividing each dimension into uniformly sized bit segments. A bounded region surrounding the received point is defined in the total number of dimensions, the bounded region being a hypercube. For each candidate, an elimination process is carried out including: determining a position of the candidate to be inside or outside the bounded region, eliminating the candidate if it is outside, storing it if it is inside, adding a further bit thereby reducing a size of the bounding region; repeating the elimination process for the candidates stored as potential solutions until a single solution is obtained; determining the transmitted symbols from the single solution found.

18 Claims, 18 Drawing Sheets

(56) References Cited

OTHER PUBLICATIONS

K. Su et al., "Efficient ML Detection for Mimo Channels: Ordered Sphere Decoding", University of Cambridge, Computer Laboratory, Digital Technology Group, 2002-2006 DTG http://www.cl.cam.ac.uk/research/dtg/publications/public/ks349/Su Karen.pdf.

T. Kailath et al., "MIMO Receive Algorithms", Part III, Section 15, pp. 302-321 of book Space-Time Wireless Systems, from Array Processing to MIMO Communications, Cambridge University Press, 2006.

B. Hassibi et al., "On the Sphere-Decoding Algorithm I. Expected Complexity", IEEE Transactions on Signal Processing, vol. 53, No. 8, p. 2806-2818, 2005.

Monteiro et al., "Euclidean Distances in Quantized Spaces with Pre-stored Components for MIMO Detection", European Conference on Wireless Technologies, Oct. 1, 2007, p. 150-153, XP031190929, Piscataway, USO.

Monteiro et al., "Progressive Hypercube Decoding", International Symposium on Wireless Communications Systems, Oct. 1, 2007, p. 1-5, XP031166719, Piscataway, USO.

European Patent Office, "Invitation Pursuant to Article 94(3) and Rule 71(1) EPC" for corresponding European Patent Application No. 09172394.0, Netherlands.

European Patent Office, "Communication Pursuant to Article 94(3) EPC" for corresponding European Patent Application No. 09172394.0, dated Nov. 22, 2010.

Barker Brettell, "Response to Communication", for corresponding European Patent Application No. 09172394.0, dated Apr. 18, 2010.

European Patent Office, "Communication Pursuant to Article 94(3) EPC" for corresponding European Patent Application No. 09172394.0, dated Jun. 24, 2011.

Barker Brettell, "Response to Communication", for corresponding European Patent Application No. 09172394.0, dated Jul. 19, 2011.

* cited by examiner

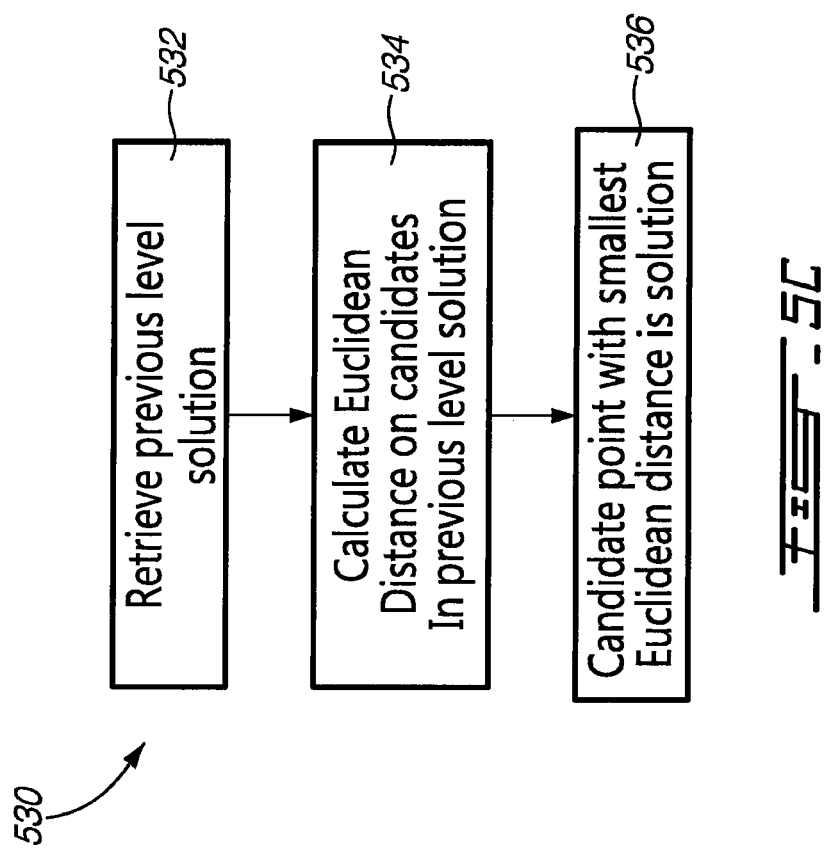

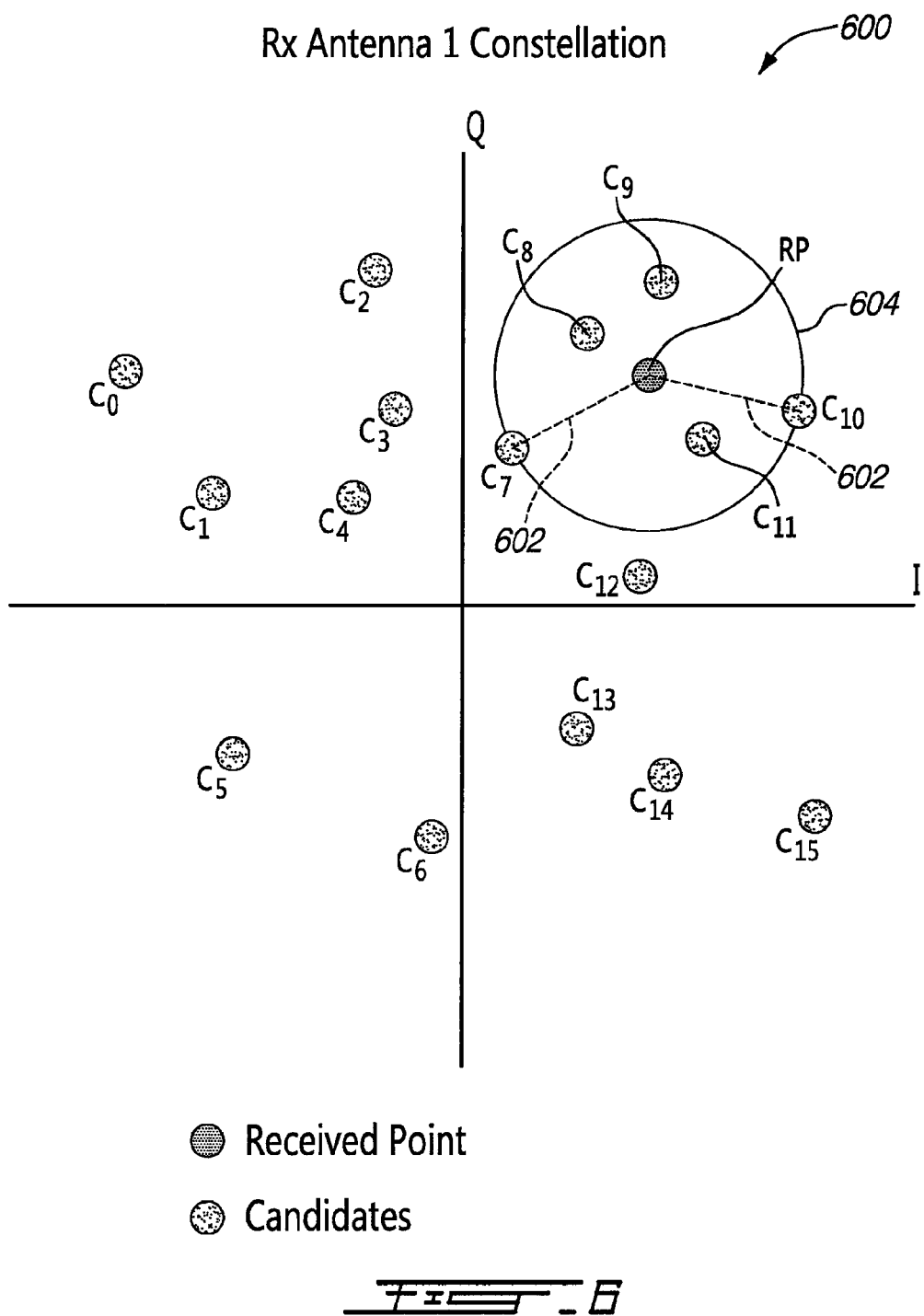

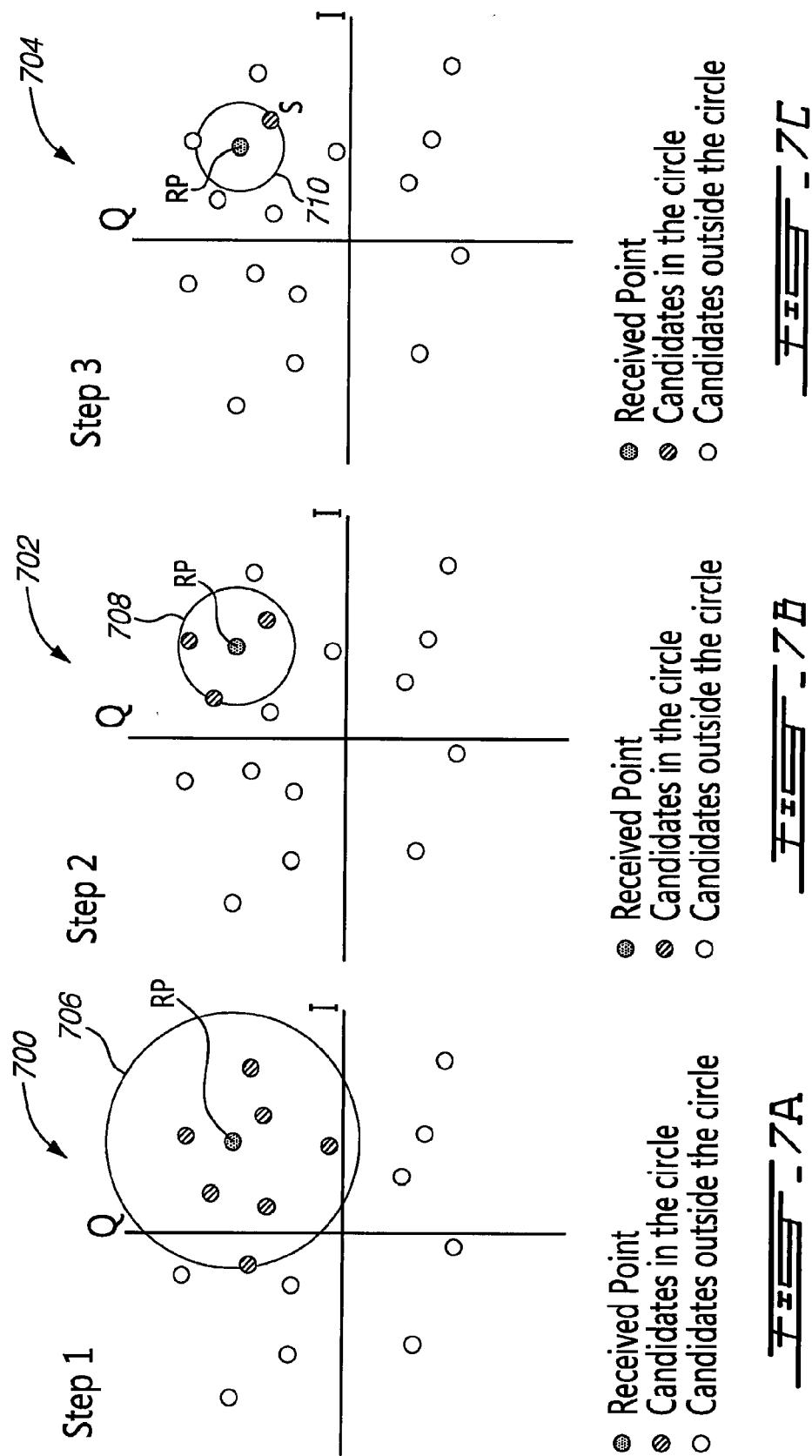

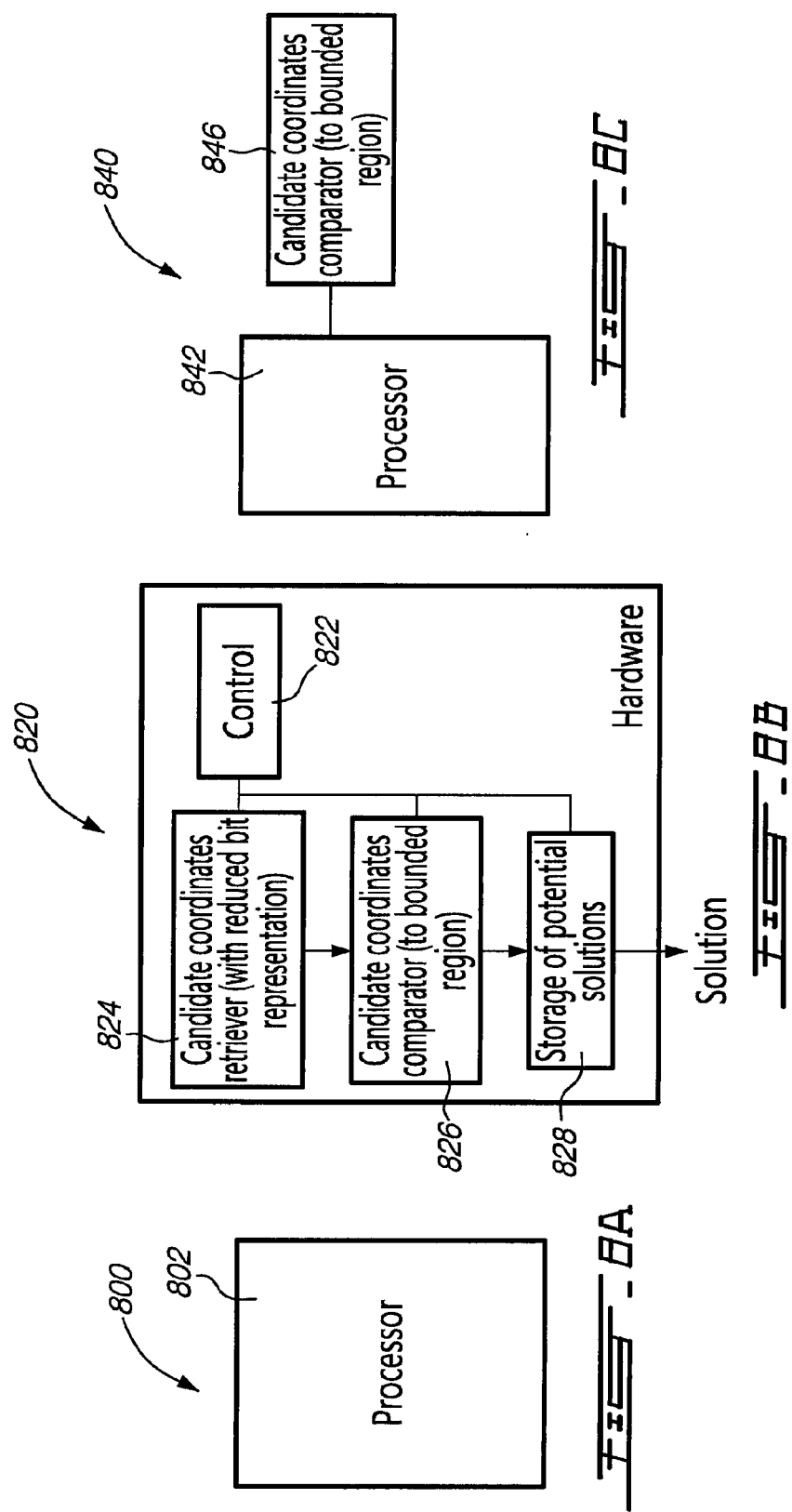

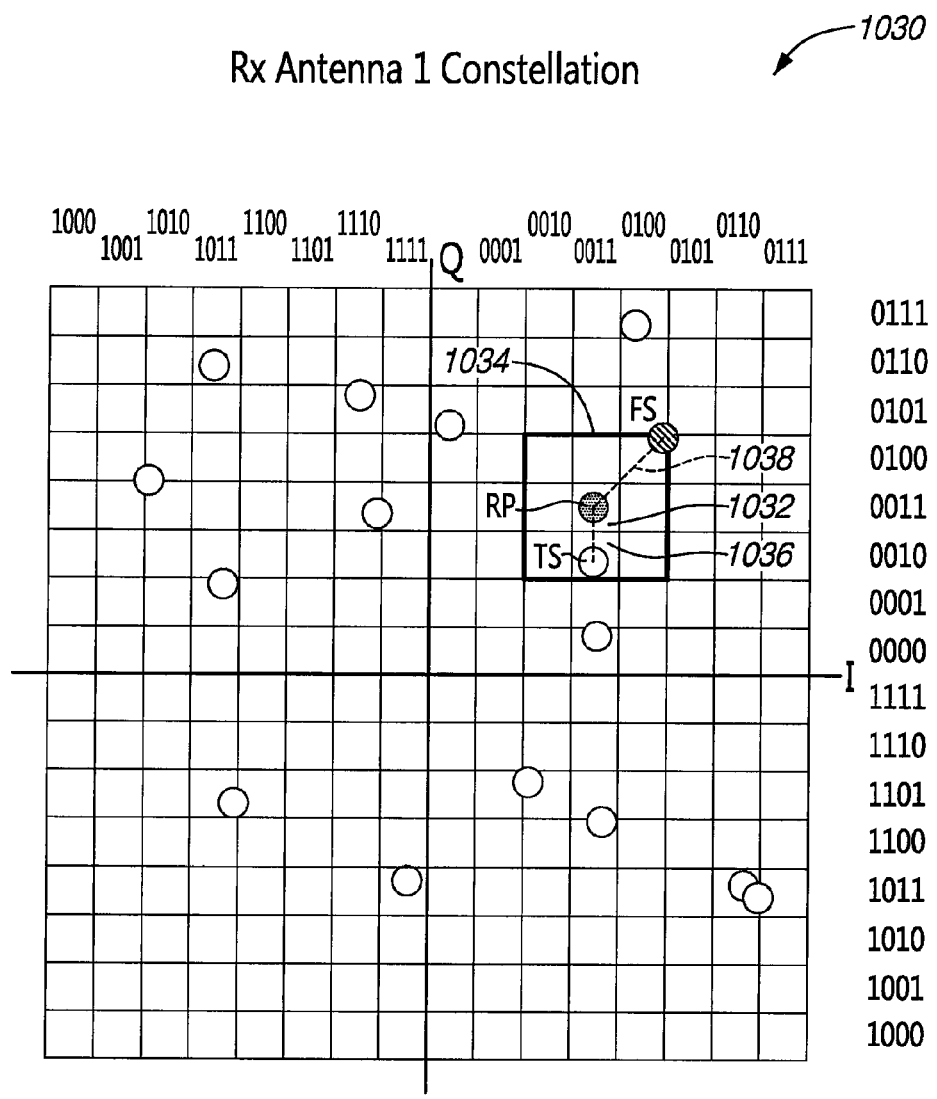

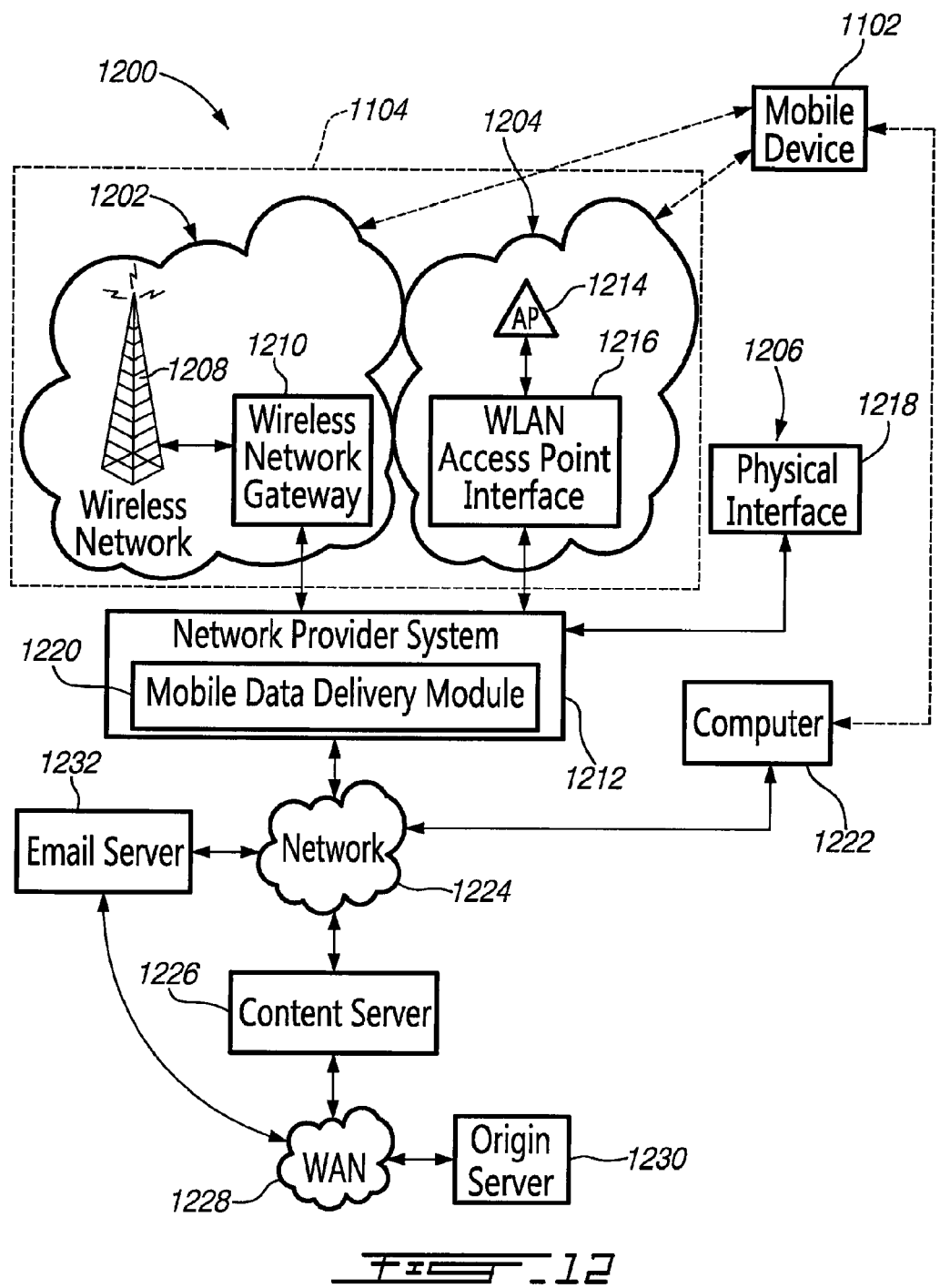

SYSTEM AND METHOD FOR MIMO DECODING

CROSS-REFERENCE TO RELATED APPLICATIONS

This application is a continuation of U.S. patent application Ser. No. 12/574,734 filed Oct. 7, 2009, now U.S. Pat. No. 8,300,737 the disclosure of each of which is incorporated herein by reference in its entirety.

TECHNICAL FIELD

The present disclosure relates generally to MIMO decoding and more particularly to MIMO decoding using successively smaller bounded regions.

BACKGROUND

The use of multiple antennas at both the transmitter and receiver ends, commonly known as Multiple Input Multiple Output (MIMO), is now widespread in Fourth Generation (4G) wireless communication applications. MIMO allows large improvements in spectral efficiency, cell capacity, and user throughput. MIMO exploits multipath on the channel to yield the capacity improvements.

One particular MIMO scheme is called Spatial Multiplexing (SM). With SM, independent streams of data are transmitted from each antenna using the same time and frequency resource. In an Orthogonal Frequency Division Multiplexing (OFDM) system, for instance, independent symbols are transmitted from each antenna in the same OFDM symbol and the same subcarrier location. The streams of data combine in the air, interfering with each other. The symbols are received on multiple receive antennas and are then processed in a MIMO decoder. A MIMO decoder is a signal processing device that separates the independent streams of data.

Standard Maximum Likelihood Decoding (MLD) is currently an optimal detector in terms of its ability to successfully determine what symbols were transmitted in the different streams. The problem with standard MLD is that it is very complex and moreover the complexity grows exponentially with the number of antennas and the modulation order (as $M^{N_t}$ where M is the modulation order and $N_T$ is the number of Transmit antennas).

Sphere decoding is an algorithm that achieves the performance of MLD at a reduced complexity. In sphere decoding, a sphere is defined about the received point and potential solutions that fall outside of the sphere are eliminated. A QR decomposition is first performed on the channel matrix H, after some mathematical manipulation, the Q matrix is then multiplied by the received point to obtain a transformed received point. The spheres are defined about the transformed received point. The potential solutions are the actual transmitted constellation points scaled by the R matrix. It considers one dimension at a time, I of Tx antenna 1, Q of Tx antenna 1, I of Tx antenna 2 and Q of Tx antenna 2.

The problem with such decoders is that their complexity requires a significant power consumption and processing time.

There is a need for a decoder that retains a performance which is very reliable but with a fraction of the complexity in order to reduce power consumption and processing time.

BRIEF DESCRIPTION OF THE DRAWINGS

Reference will now be made to the drawings, which show by way of example embodiments of the present disclosure, and in which:

FIG. 5 comprises FIG. 5A, FIG. 5B and FIG. 5C which are flow charts of embodiments of the MIMO Decoding processes, FIG. 5B shows the preprocessing process to obtain candidate coordinates and FIG. 5C shows a Euclidean Distance calculation process;

FIG. 6 shows the general principle of a hyper-sphere surrounding the received point to determine the candidate with the smallest Euclidean distance;

FIG. 7 comprises FIG. 7a, FIG. 7b and FIG. 7C which show successive iterations of the candidate elimination process using successively smaller spheres;

FIG. 8 comprises FIG. 8A, FIG. 8B and FIG. 8C which are alternate embodiments of a system implementation for process 500;

FIG. 12 is a block diagram of a communications system for use with the wireless device of FIG. 11.

It will be noted that throughout the appended drawings, like features are identified by like reference numerals.

DETAILED DESCRIPTION

Figures 1A, 1B:
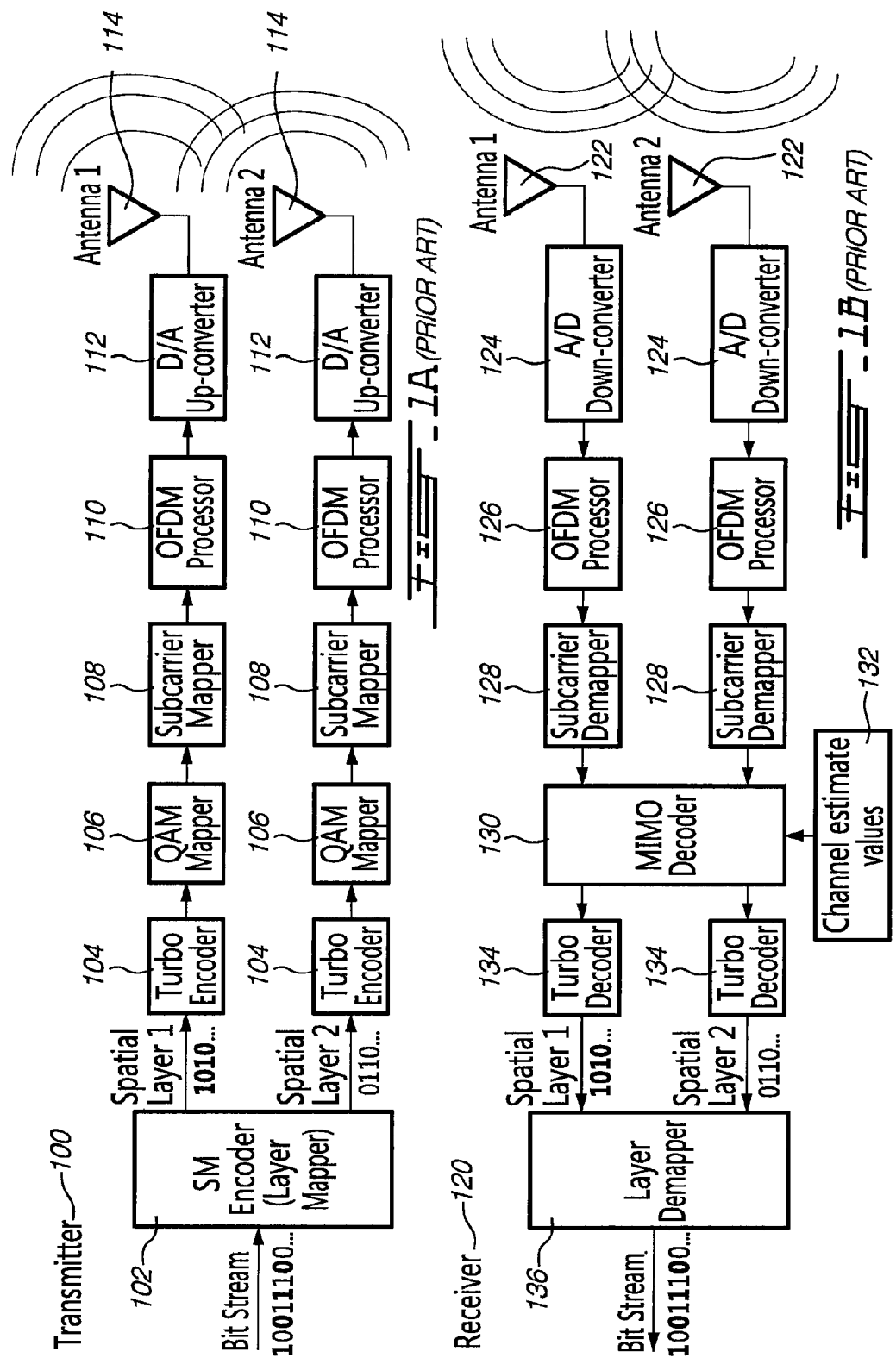
FIG. 1 (Prior Art) comprises FIG. 1A and FIG. 1b which are block diagrams of the main components of a MIMO system of the prior art, FIG. 1A for the transmitter end and FIG. 1B for the receiver end.

FIG. 1 (Prior Art) illustrates an OFDM system with turbo decoding for Forward Error Correction (FEC). In this example, there are two transmit antennas 114 at the Transmitter end 100 shown in FIG. 1a and two receive antennas 122 at the Receiver end 120 shown in FIG. 1b. This is called a 2×2 system. The problem to be solved by the MIMO decoder generalizes naturally to more antennas, with even larger increases in spectral efficiency and also increased complexity.

Figure 2C:
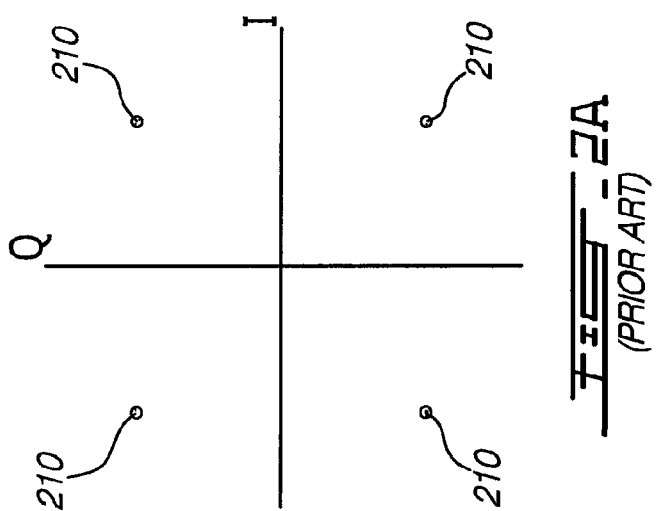
FIG. 2 (Prior Art) comprises FIG. 2A, FIG. 2B and FIG. 2C which are graphical representations of the QAM constellation points for QPSK in FIG. 2A, 16-QAM in FIG. 2B and 64-QAM in FIG. 2C.
Figure 2B:
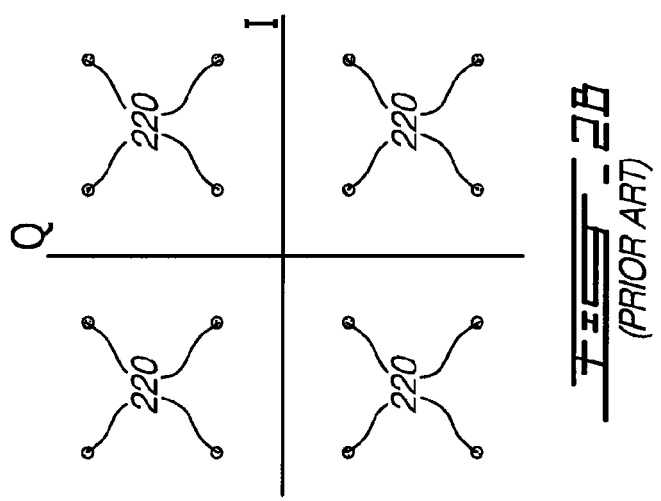
Figure 2A:
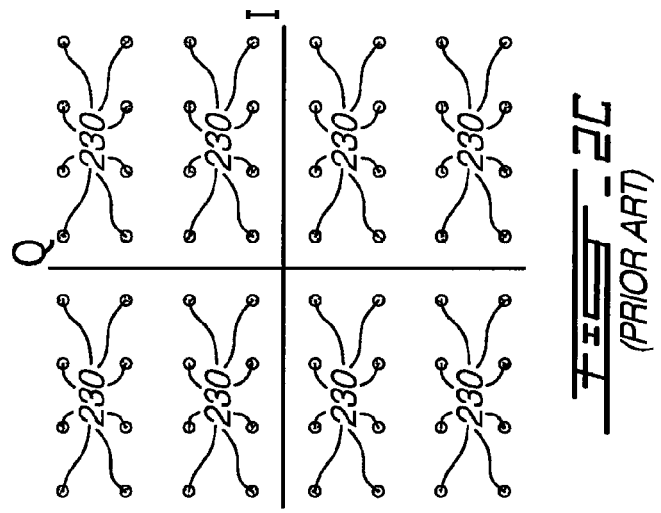

At the transmitter end 100 shown in FIG. 1a, the stream of bits to be transmitted is broken into two independent streams called spatial layers by the SM Encoder 102. These streams of bits are broken up into code blocks and encoded by a Turbo encoder 104. The bits out of the Turbo encoder are then QAM modulated by a QAM Mapper 106. Commonly QPSK, 16-QAM, and 64-QAM are used. These mappers 106 map 2, 4, and 6 bits respectively to a single symbol leading to 4, 16, and 64 different constellation points. FIG. 2 (prior art) shows the constellations for the different modulation orders, the x-axis being the real axis I, the y-axis being the imaginary axis Q. FIG. 2a is for a QPSK mapping with 2 bits yielding 4 different possible constellation points, FIG. 2b is for a 16-QAM mapping with 4 bits yielding 16 different possible constellation points and FIG. 2c is for a 64-QAM with 6 bits yielding 64 different possible constellation points.

The QAM symbols are mapped to subcarrier locations by a subcarrier mapper 108 and put through the OFDM processing by OFDM processor 110 which includes an IFFT and the insertion of a cyclic prefix. These samples are converted to analog signals which are up-converted to the carrier frequency by the D/A up-converter 112 and transmitted through independent transmit antennas 114. The signal sent by each of the transmit antennas 114 corresponds to one of the constellation points 210, 220, 230 of one of the QAM mapping of FIG. 2, depending on the QAM mapping used.

Alternative orderings of the blocks in the transmit system 100 are possible. In particular, the stream of bits may first be Turbo encoded by the turbo encoder 104 and possibly QAM mapped by the QAM mapper 106 and mapped to subcarrier locations by the subcarrier mapper 108 prior to the layer mapping done by the SM encoder 102. The corresponding reverse ordering would be required at the receiver end 120.

After transmission, as the signals propagate through the air, the signals combine, interfering with each other. The presence of multipath propagation between different pairs of transmit and receive antennas ensures that sufficient information is present in the received signals to recover the originally transmitted signals.

At the receiver end 120, each signal received by the receive antennas 122 is down-converted to baseband and converted to the digital domain by the A/D Down-converter 124. The OFDM processing is reversed by removing the cyclic prefix and performing the FFT by the OFDM processor 126. At this point one obtains a collection of subcarriers. Because the subcarriers in OFDM are orthogonal to each other, the symbols transmitted on individual subcarriers have not mixed together. This allows decoding the symbols on the subcarriers one at a time using the subcarrier demapper 128. This is why OFDM is typically used with MIMO. The received subcarrier values for each of the receive antennas determined by the subcarrier demapper 128 is fed into the MIMO decoder 130. Also fed into the MIMO decoder are a set of channel estimate values for each subcarrier 132. The channel estimate values 132 include an estimate of the channel from each transmit antenna to each receive antenna for each subcarrier. For a 2×2 system this means there are four channel estimates for each subcarrier. The channel estimate values 132 are derived in a separate channel estimation unit (not shown) from pilot signals transmitted on a set of subcarriers that are distributed in both time and frequency throughout the transmitted OFDM signal.

The MIMO decoder 130 attempts to separate the symbols transmitted from the two different antennas 114. From these symbols, the MIMO decoder 130 computes soft bit values called Log Likelihood Ratios (LLRs). The signs of the LLRs indicate the bit polarity (0 or 1) while the magnitudes indicate the probability or reliability of the bit. A large positive value for instance would correspond to a 0 being transmitted with a high degree of confidence. A large negative value would correspond to a 1 being transmitted with a high degree of confidence. A LLR value of 0 would indicate that the bit is equally likely to be a 0 or a 1. The LLRs are fed to a Turbo decoder 134 which identifies and corrects bit errors. The original spatial layers of the transmitter end are identified. Finally, the two spatial layers are put back into a single stream by the layer demapper 136 and the original bit stream to be transmitted is obtained at the receiver end 120.

Mathematically the problem which the MIMO decoder 130 has to solve can be expressed by the following equation:

$$\begin{bmatrix} r_1 \\ \vdots \\ r_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} t_1 \\ \vdots \\ t_{N_T} \end{bmatrix} + \begin{bmatrix} n_1 \\ \vdots \\ n_{N_R} \end{bmatrix}$$

This equation only considers the signals on a single subcarrier. Here $r_i$ is the received subcarrier value for receive antenna i of which there are $N_R$. $n_i$ is the noise plus interference received on antenna i, and $t_i$ is the transmitted subcarrier value from transmit antenna i of which there are $N_T$. $r_i$, $n_i$, and $t_i$ are all complex values. $h_{i,j}$ is the complex channel gain for the channel from transmit antenna i to receive antenna j. The transmitted symbols in the equation are taken from the constellation points, for example those shown in FIG. 2.

Figure 3:
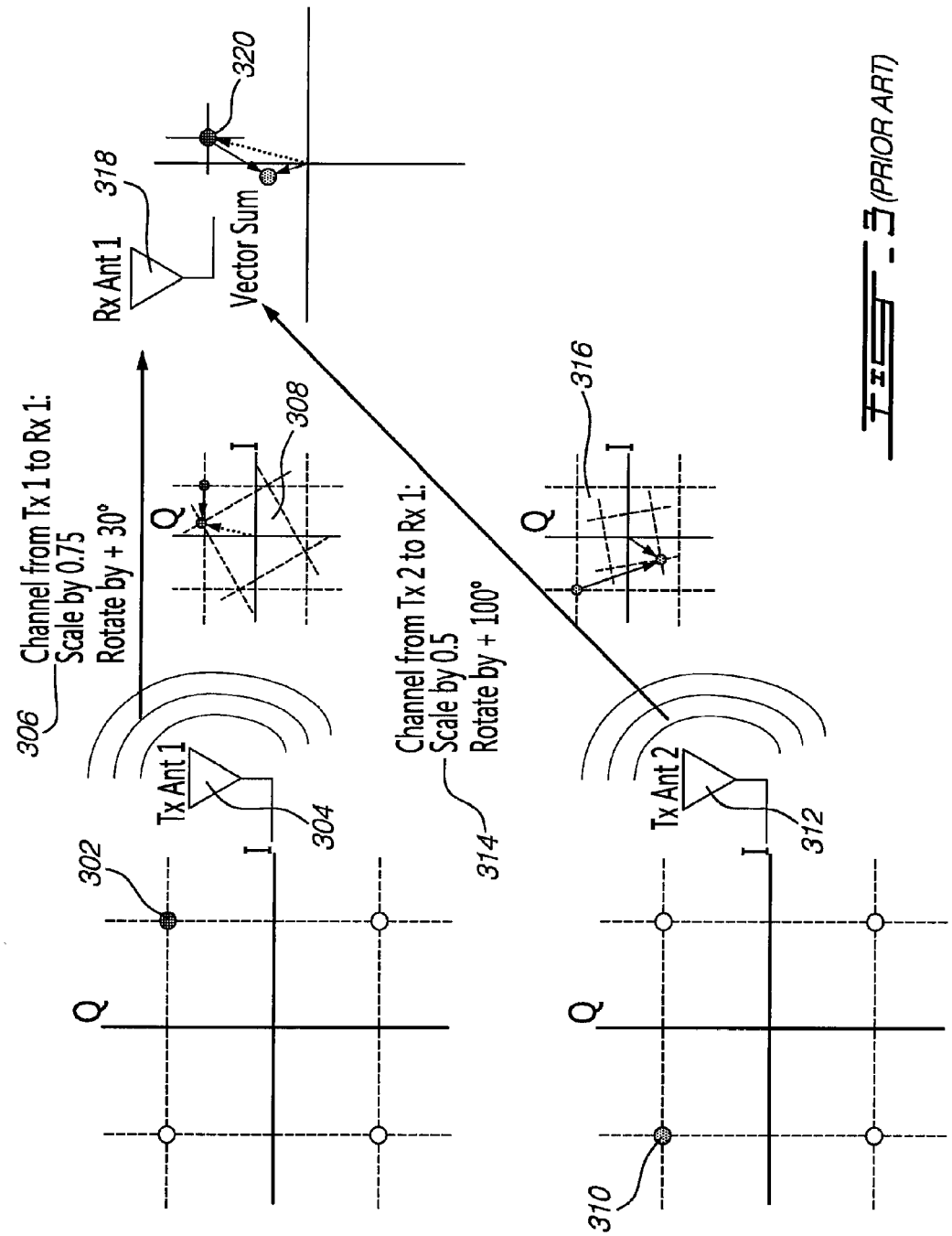
FIG. 3 (Prior Art) is a graphical representation of the vector sum of signals for two transmit antennas.

What the matrix equation expresses is that the received signal on any given receive antenna 122 is a combination of the transmitted constellation points where each constellation point has been scaled by some complex number (the channel gains). This scaling is the effect of the propagation of the signal through the air and it can be estimated. The combination of scaled constellation points is a vector sum in the complex plane. FIG. 3 shows two independent QPSK constellation points 302, 310 transmitted by two transmit antennas 304, 312 respectively, scaled by different estimated complex channel gains 306, 314 respectively, the scaling being graphically represented by scaling diagrams 308, 316 respectively, received in combination by the receive antenna 318 and represented as being added together as vectors in the complex plane 320.

The standard MLD algorithm currently operates by brute force. The algorithm considers each possible unique combination of transmitted constellation points from the transmit antennas. These possible combinations of the constellation points from the transmit antennas are called candidates.

With QPSK, one of four possible constellation points from transmit antenna one may be transmitted and, independently, one of four possible constellation points from transmit antenna two may be transmitted. There are thus 4×4=16 possible candidates (i.e. 16 possible combinations). For 16-QAM, one of 16 possible constellation points may be transmitted from each antenna leading to 16×16=256 possible candidates. And finally for 64-QAM, there are 64×64=4,096 possible candidates. Note that the modulation order on each transmit antenna may be different. The total number of candidates is the product of the constellation size employed for each transmit antenna.

The standard MLD algorithm considers each of the possible candidates one at a time. For each candidate, the estimated complex channel gains are used to compute the vector sum of the candidate points. This is done for both of the receive antennas. The Euclidean distance squared to the received point is then computed for both receive antennas. Finally the sum of the Euclidean distance squared values for the two receive antennas is evaluated and the square root taken to give a total Euclidean distance. The candidate with the minimum total Euclidean distance is declared as the solution, the corresponding constellation points for each antenna are declared to be the ones that were transmitted.

Figure 4:
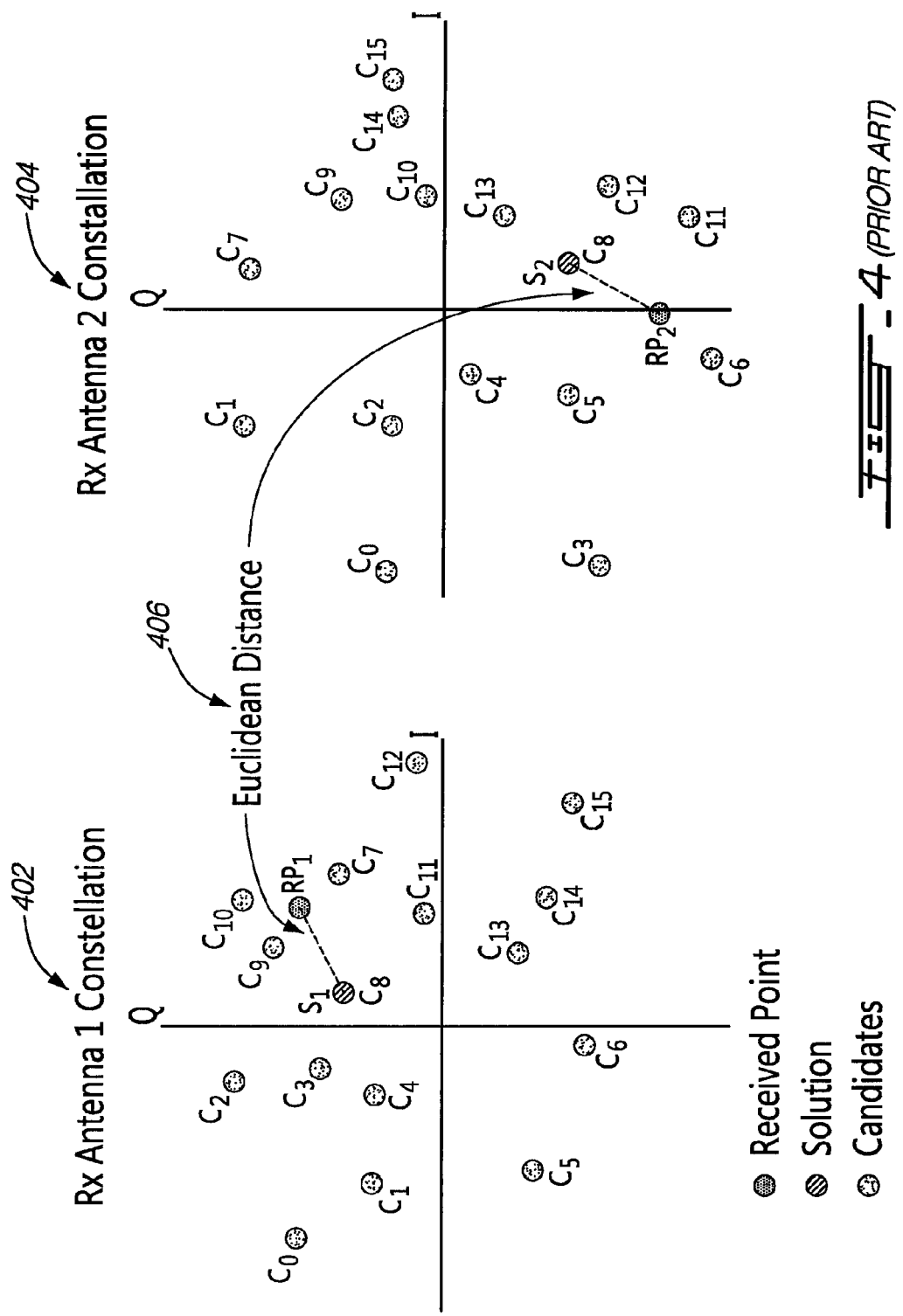
FIG. 4 (Prior Art) is a graphical representation of the MLD Total Euclidean Distance calculation.

FIG. 4 shows the received points RP for each receive antenna 402, 404 and the set of candidate points C1 to C16 for each receive antenna 402, 404. There are 16 candidates shown for each receive antenna constellation, the candidates are the estimated scaled sums for each antenna. This corresponds to a system where QPSK is being transmitted on each of the two transmit antennas. The candidate with the minimum total Euclidean distance 406 is the solution, that is the closest point, and is identified as S1 and S2. The candidate point identified as the solution S1 and S2 is C8. Note that the point with the minimum total Euclidean distance is not necessarily the point with minimum Euclidean distance on the individual receive antennas 402, 404. For example, at receive antenna 1 402, the candidate point with the minimum individual Euclidean distance is C9 and at receive antenna 2 404, it is C13. However, the candidate point with the total minimum Euclidean distance is C8.

Given the estimated transmitted symbols from the multiple transmit antennas the Log Likelihood Ratios (LLRs) are then computed and passed to the Turbo decoder 134. The bits are decoded and the two layers of bits are demapped 136 back to a single stream.

Figure 5A:
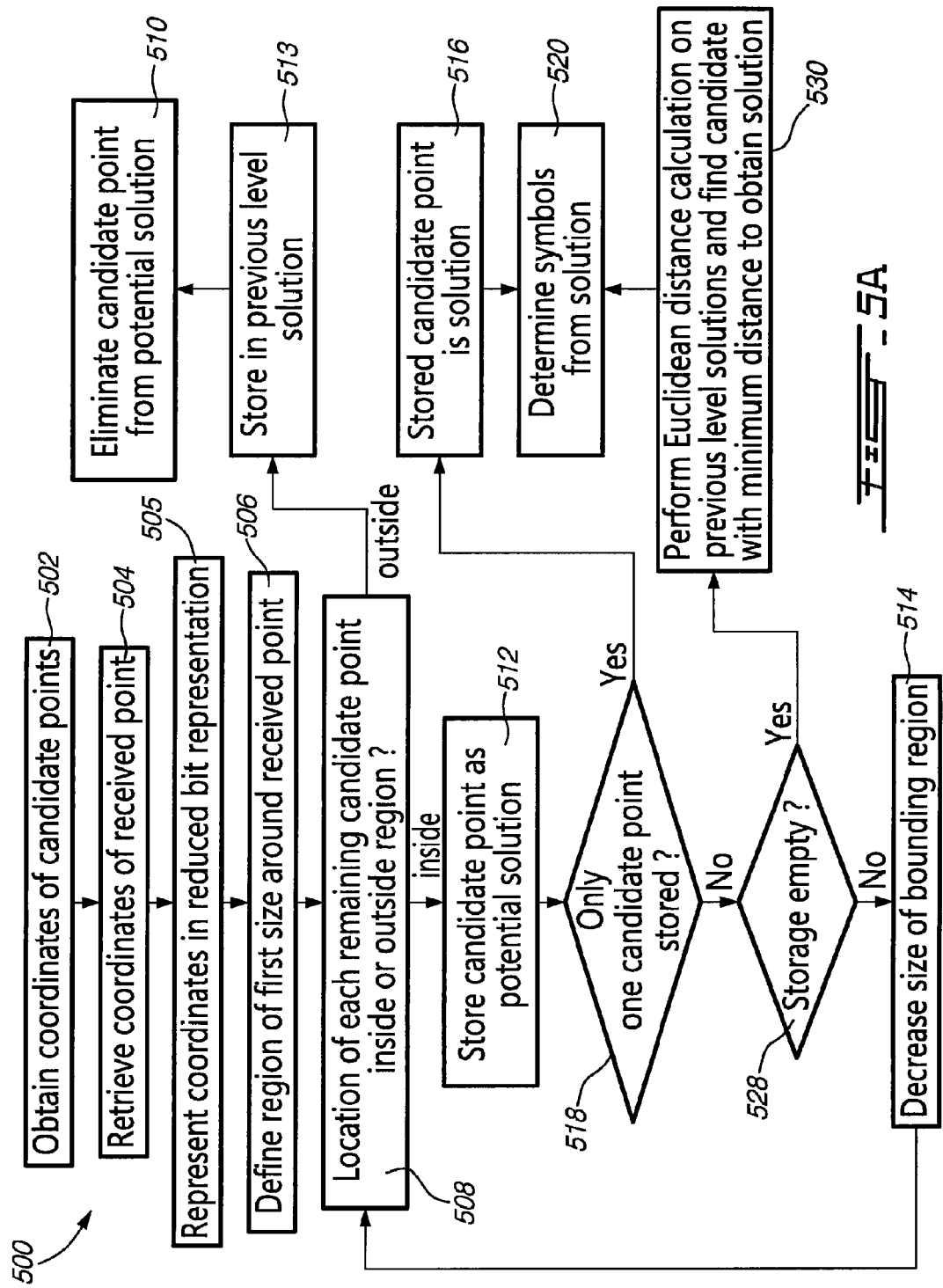
FIG. 5A shows the candidate elimination process.

FIG. 5A represents a method 500 for decoding symbols transmitted by multiple transmit antennas using signals received at multiple receive antennas in a multiple-input multiple-output (MIMO) system. The MIMO system employs spatial multiplexing with at least two transmit antennas and at least two receive antennas. The received point and the candidate points are signals that exist in multiple dimensions. The dimensions are the real (I) and imaginary (Q) components of the complex signals for each receive antenna. There are therefore $N_R \times 2$ dimensions where $N_R$ is the number of receive antennas. Coordinates are numeric values that represent the location of the signal in each dimension. A processor or hardware blocks or components or a combination thereof can be used to carry out the method 500. The process 500 comprises different steps which are optional and can be combined to form an overall process of elimination.

Figure 5B:
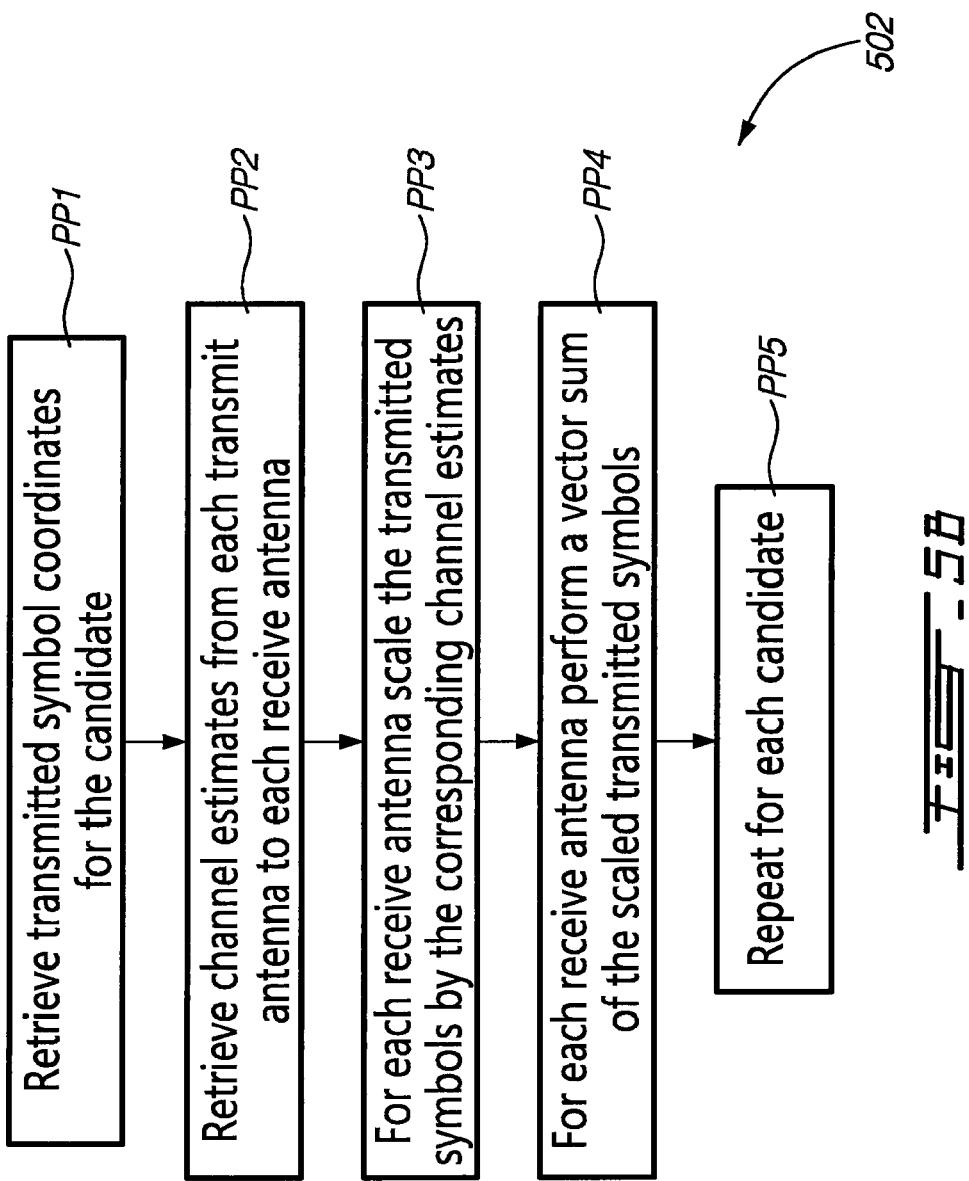

A preprocessing process to predetermine the candidates is required in order to obtain the candidates 502. The preprocessing process is standard and is shown in FIG. 5B. Considering two transmit antennas for the moment, the calculation of the candidate coordinates can be represented mathematically as $c_{p,m,n} = h_{1,p}\tau_m + h_{2,p}\tau_n$, where $c_{p,m,n}$ represents a candidate for receive antenna p with constellation point $\tau_m$ from transmit antenna 1 and constellation point $\tau_n$ from transmit antenna 2. This shows that $c_{p,m,n}$ can be expressed as the vector sum of the two transmitted constellation points each scaled by their respective channel gain.

The following process is carried out to compute the candidate coordinates. First at PP1, the transmitted symbol coordinates are retrieved for the transmitted symbols that constitute the candidate ($\tau_m$ and $\tau_n$). These are complex values chosen from a predefined finite set of values as shown in FIGS. 2A, 2B, and 2C for QPSK, 16-QAM, and 64-QAM respectively.

At PP2 a channel estimate for each receive antenna and transmit antenna combination is retrieved. These are the values $h_{1,p}$ and $h_{2,p}$ representing the channel estimate from transmit antenna 1 and 2 respectively to receive antenna p. In PP3 the transmitted symbol coordinates are scaled by the channel estimates to derive scaled transmitted symbols. The scaled transmitted symbols from both transmit antennas are then summed PP4. This is repeated for each receive antenna. The coordinates of the candidate point are then the real and imaginary parts of the computed value for each receive antenna. This computation is repeated for each candidate PP5.

Referring back to FIG. 5A, the determined candidate coordinates are retrieved 502. The coordinates of the received point are retrieved 504. The coordinates are for each dimension of the system. The total number of dimensions of the MIMO system is a product of the number of receive antennas and the number two, the number two representing real and imaginary parts of a complex number. The candidates are all possible candidates, each candidate is a unique combination of possible symbols transmitted from the multiple transmit antennas. The possible symbols are chosen from a predefined finite set of potential symbols for each of the multiple transmit antenna. The number of candidates is a product of a size of the predefined finite sets of potential symbols for all transmit antenna. That is, the number of candidates is the product of the size of the QAM modulation constellation (i.e. the predefined finite set of potential symbols) of each Tx antenna. So for instance, if QPSK (with 4 being the size) is being used on Tx antenna 1 and 16-QAM (with 16 being the size) on Tx antenna 2 then the number of candidates is 4×16=64. As another example, if there were 4 Tx antennas and each is using 64-QAM, the number of candidates would be 64×64×64×64=16,777,216.

A bounded region is defined around the received point 506.

For each one of the candidates, an elimination process is carried out. It is determined if the candidate is inside or outside the bounding region 508. Determining if a location is inside or outside comprises comparing the candidate's coordinates to the bounded region to determine if it is inside or outside of the region. Eliminating a current candidate if the current candidate falls outside the bounded region 510. Storing the current candidate if the current candidate point falls inside the bounded region as a potential solution 512.

In one embodiment, the current candidate which falls outside of the bounded region 510 can be stored in a previous level solution storage 513.

Successively reducing a size of the bounded region 514. Repeating the determining if a location is inside or outside 508, eliminating 510 or storing the current candidate 512 until a single solution is found among the potential solution 516. In order to determine if the potential solution includes only one candidate, verification is made 518. Finally, determining the symbols from the single solution found 520.

In one embodiment, if the storage is found to be empty after verification 528 then the precise Euclidean distance will be calculated for each of the candidate points of the previous stored set. A Euclidean distance calculation process is carried out 530 to determine the solution. The candidates from the previous level solution storage (stored in 513) are retrieved. Calculating a Euclidean distance of the candidate point to the received point 534. The candidate with the smallest Euclidean distance is determined to be the solution 536.

Process 500 will now be detailed and examples will be given.

The main portion of process 500 is to search within successively smaller regions. For the moment let us consider only two dimensions, namely the I and Q dimensions of a single receive antenna. Therefore, if the regions are spheres, the spheres are circles. In FIG. 6, the set of candidates C0 to C15 are shown for receive antenna 1 600. The candidate points with an equal Euclidean distance 602 fall on the contour of a circle 604 about the received point RP. Candidate points C7 and C10 both fall on the contour of the circle 604 which has its center at the received point RP. Therefore, points C7 and C10 are equidistant from the received point RP.

Now let us consider the problem of finding the candidate point closest to the received point RP for this single receive antenna 600. The first idea is to define a circle around the received point and then evaluate each of the candidate points one at a time checking to see if it is in the circle. Any points outside of the circle are rejected and not considered any further.

Then a smaller circle is defined and the process is repeated for each of the remaining candidates by checking to see if they fall inside this new smaller region eliminating those that do not. This process is repeated in an iterative fashion with successively smaller circles until there is only a single candidate. Clearly this candidate is the point with minimum Euclidean distance to the received point. FIG. 7 illustrates the process in three iterations 700, 702, 704 represented in FIG. 7a, FIG. 7b and FIG. 7c. The Received Point RP is at the center of the circle. At 700, there are 7 candidates in the circle 706 and 9 candidates outside of the circle. At 702, there are 3 candidates in the circle 708 and 13 candidates outside of the circle. At 704, there 1 only one candidate in the circle 710 and 15 candidates outside of the circle. Therefore, the remaining candidate in 704 is the closest candidate to the RP and the solution S.

Note that each successive iteration has a smaller set of candidates with which to perform the comparison. Therefore, the bulk of the complexity is in the first few iterations (particularly the first one) when there are a large number of candidates to consider and then the complexity decreases dramatically.

FIG. 8 shows alternate embodiments of a system implementation for process 500. In FIG. 8A, the system 800 comprises a processor 802. The method may be implemented as software running on a processor. The processor is considered to be an advanced type of hardware component. Alternatively, the method may be implemented in whole or in part in specialized hardware blocks rather than run as software on a processor. This is particularly the case where reduced bit representation is used as processors typically operate on numerical values that are multiples of 8 bits. As shown in FIG. 8B, the system 820 comprises hardware components or blocks. There is a candidate coordinates retriever 824 which uses the reduced bit representation for the coordinates. It then communicates the coordinates to the candidate coordinates comparator 826 which compares the coordinates to the bounded region. Finally, a storage 828 is present to store potential solutions. A control unit 822 supervises operation of the system.

A third possibility shown in FIG. 8C is to have the method run on a processor for control and for processing of the operations that may operate at full precision (such as the full-precision Euclidean distance calculation) but with the aid of special instructions. These special instructions pass the numerical values to a small, specialized hardware component or block that performs operations on those value. These specialized hardware blocks may more naturally perform operations on reduced bit representations. In system 840, a processor 842 interacts with a candidate coordinates comparator 846 for the comparison to the bounded region.

It is possible to represent the received point and the candidate points by a small number of bits, namely the most significant bits. The reduced bit representation is a small number of most significant bits of a full bit representation. This reduced bit representation divides the complex plane into a set of uniformly sized squares. It divides each dimension into uniformly sized bit segments. The bounding spheres (or circles in two dimensions) are approximated by square regions with the boundaries of the square region being set by the outer edges of the squares adjacent to the square containing the received point. The reduced bit representation is determined at 505 of process 500.

Figure 9A:
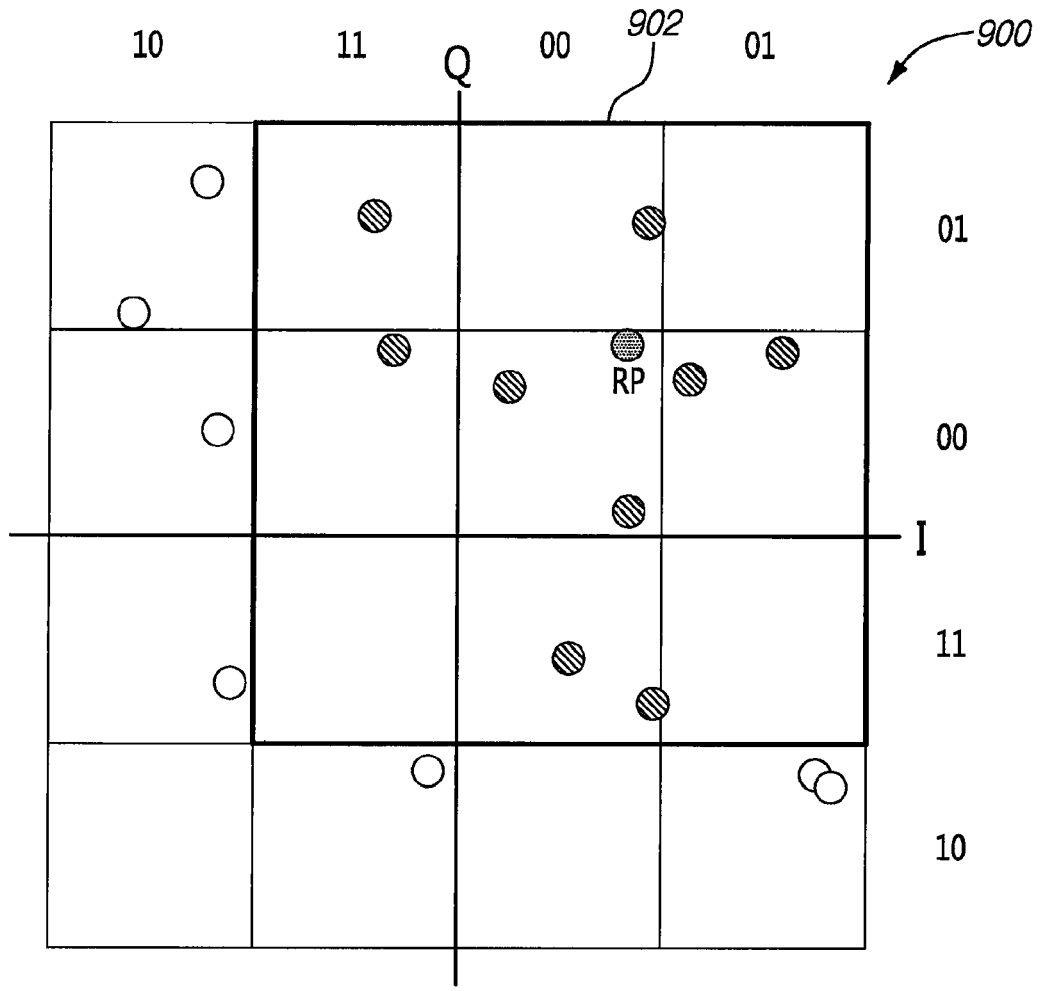
FIG. 9 comprises FIG. 9A, FIG. 9B and FIG. 9C which show successive iterations of the candidate elimination process using successively smaller hyper-cubes.

Each candidate point $c_{p,m,n}$ and each received point is a complex number with a certain number of bits for the real and imaginary parts, 16 bits for instance. The first concept is to use only a small number of the most significant bits (MSBs) to represent the coordinates of the candidate and received points. For instance only the two MSBs may be taken for each of the imaginary and real parts. This divides up the complex plane 900 into 16 different square regions as seen in FIG. 9A. The second concept is to approximate the circles used to search for the closest candidate by a bounding square 902 about the received point RP where the square is bounded by the outer edges of the square bit regions adjacent to the square containing the received point RP.

FIG. 9A has the received point RP for receive antenna one and 16 candidate points corresponding to a 2×2 system with QPSK symbols transmitted from both antennas. The 16 boxes of the two bit representation 900 denote regions defined by a two-bit representation (the two MSBs) of the coordinates of the candidates and received point. Along the top and right side are the values of the two bits when using a two's complement representation of the numbers. Here the received point RP has an I value of '00' and a Q value of '00'.

The circle is approximated by the square in which the received point RP sits along with all of the adjacent squares to form the 3×3 square 902. Candidate points within square 902 are considered to be inside the region and are therefore labeled $C_{ir}$ while those contained in the remaining boxes are considered to be outside the region, are labeled $C_{or}$ and are rejected from further consideration. There are 9 candidate points inside region 902.

The same principle is applied successively to smaller circles by successively adding a MSB to the representation of each of the candidates and received points and then redefining the boundaries.

Figure 9B:
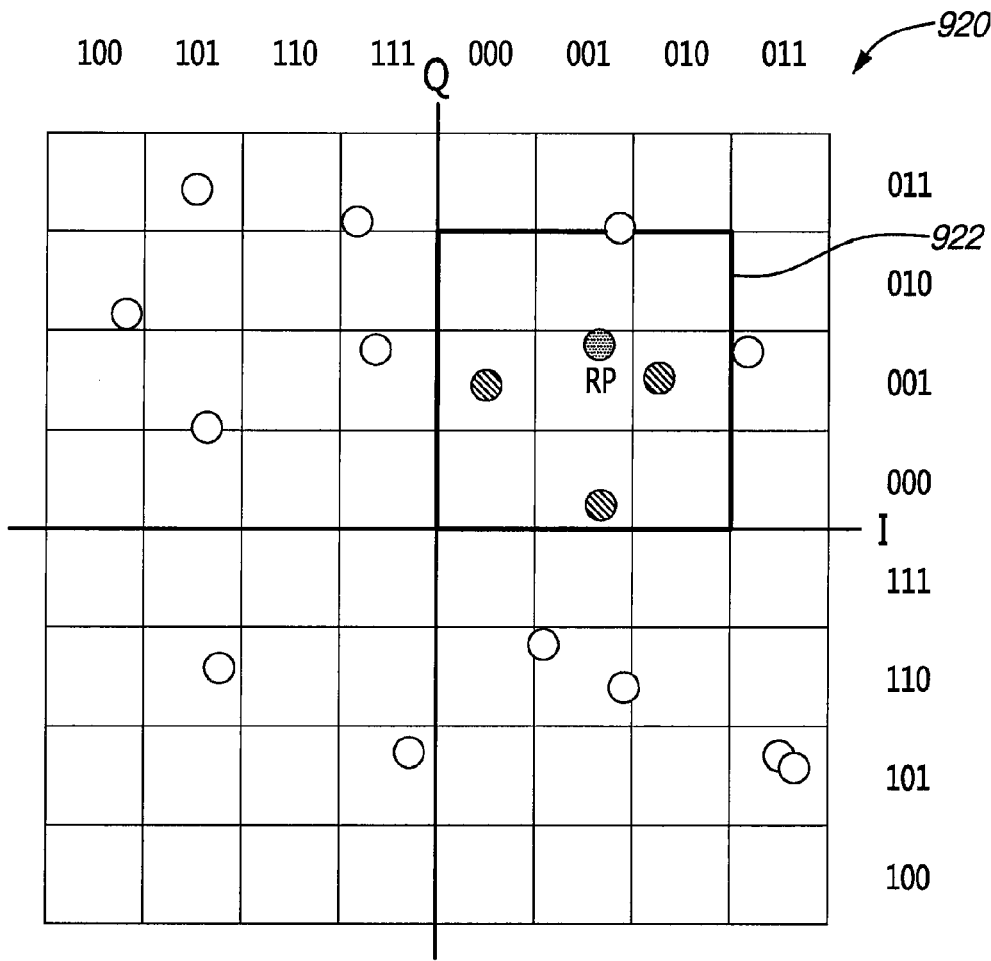

FIG. 9B shows the three bit representation 920 having the three bits regions and the set of candidates that are both inside and outside of the region. The circle is approximated by the square in which the received point RP sits along with all of the adjacent squares to form the 3×3 square 922. Candidate points within square 922 are considered to be inside the region and are therefore labeled $C_{ir}$ while those contained in the remaining boxes are considered to be outside the region, are labeled $C_{or}$ and are rejected from further consideration. There are 3 candidate points inside region 922.

Figure 9C:
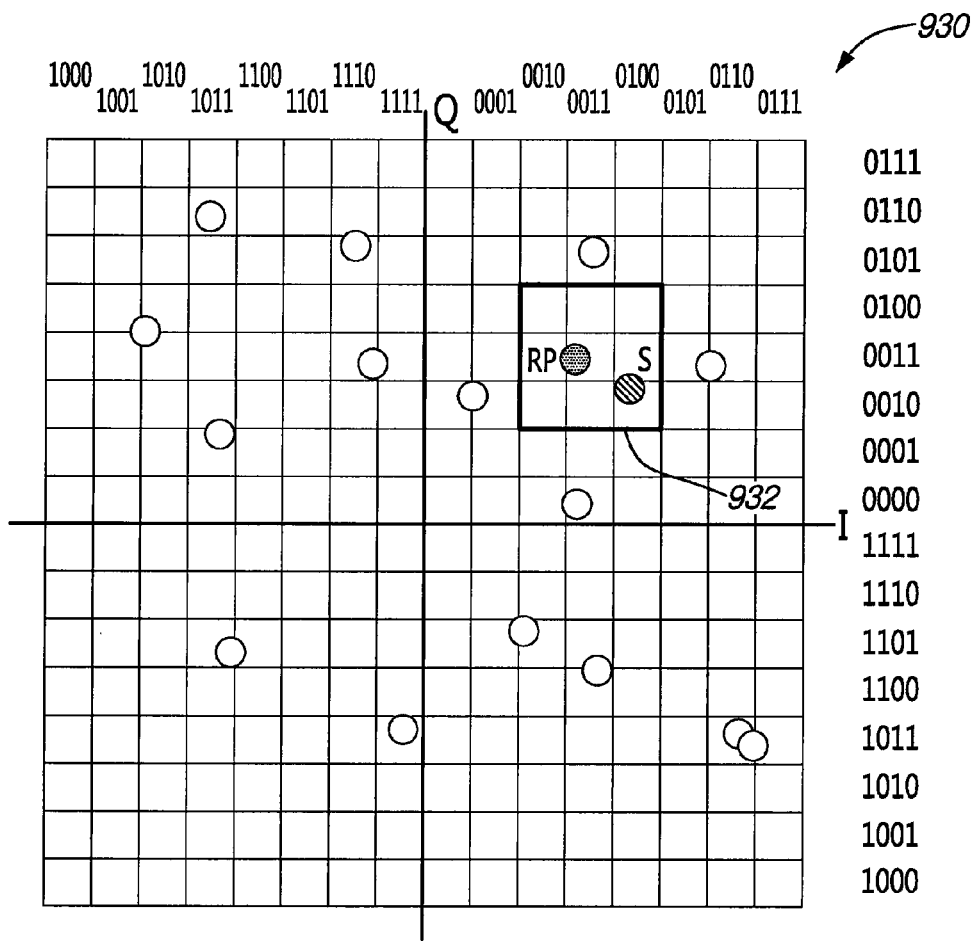

FIG. 9C shows the four bit representation 930. The circle is approximated by the square in which the received point RP sits along with all of the adjacent squares to form the 3×3 square 932. Candidate points within square 932 are considered to be inside the region and are therefore labeled $C_{ir}$ while those contained in the remaining boxes are considered to be outside the region, are labeled $C_{or}$ and are rejected from further consideration. At this point only a single candidate remains within the in-bounds region 932. This point $C_{ir}$ is the candidate point closest to the received point in Euclidean distance and is declared as the solution.

Therefore, in one embodiment, the coordinates of the received point and each of the candidates is represented by a small number of most significant bits of a bit representation. When the problem is considered properly with multiple receive antennas, the number of dimensions increases. There is one dimension for each of the I (real) and Q (imaginary) for each of the receive antennas. The resulting bounded region is a hypercube, wherein the complex plane is divided into hypercubes naturally defined by the bit representation. The bounded region comprises the hypercube in which the received point is and all adjacent hypercubes. The bounded region has a region segment in each dimension, the region segment in each dimension is a bit segment for the received point coordinate in that dimension and the two adjacent bit segments adjacent to the bit segment for the received point coordinate in that dimension.

In that case, successively reducing the size of the bounded region is done by adding a further bit to the received point coordinates and each of the candidates coordinates, thereby reducing the size of the single-bit wide hypercubes. The size of the uniformly sized bit segments is reduced in each dimension thereby reducing a size of the bounding region.

The search for the solution can be performed on one dimension at a time (i.e. I or Q for one of the receive antennas). For instance, the decoder can check each candidate's I value for one of the receive antennas first (starting for example with the two MSBs) and determine which points fall within the same or adjacent segment of the received point along that dimension. Any candidate point that falls outside this segment can be rejected and does not need to be considered any further. Then the decoder can move to the Q dimension of the same receive antenna and check the remaining candidates to see if they fall in the bounding region in that dimension. This idea saves significant complexity because there are fewer candidates to evaluate in the Q dimension. Then the I dimension of the second receive antenna can be used to eliminate candidates. And finally, the Q dimension of the second receive antenna can be considered.

Rather than performing a proper Euclidean distance, it is possible to perform the comparisons to determine if the candidate point is within the bounding region with simple logical bit operations using the bits in the reduced bit representation of the coordinates of the receive and candidate points. Furthermore, the comparison logic equations can be optimized to decrease complexity and eliminate as many candidates as possible by considering the received point's location.

When only using a small number of bits to represent the values, the comparison operation to determine if a candidate is inside or outside of the bounding region can be performed by simple logical bit operations. For instance, with a two bit comparison and a two's complement representation the comparison can be performed with the following logic equations.

Assume the candidates and the received point are represented by 16 bit values. Let the bits of the candidate (in one of the dimensions) be represented by $c_{15}c_{14}\ldots c_2c_1c_0$ and the bits of the received point by $r_{15}r_{14}\ldots r_2r_1r_0$ where the bit with the 15 as index is the MSB and the bit with index 0 is the least significant bit (LSB). Therefore, $c_{15}c_{14}$ is the two-bit representation of the candidate and $r_{15}r_{14}$ is the two-bit representation of the received point.

If the received point is in one of the periphery regions (i.e. either '01' or '10') then the candidate is inside the bounding region if it is has the same MSB as the received point. In other words the point is kept if the following logic expression is true: $\text{xnor}(c_{15}, r_{15})$ If the received point is in one of the interior regions (i.e. either '00' or '11') then the candidate is inside the bounding region if it has the same MSB or opposite LSB, namely if the following logic expression is true: or (xnor($c_{15}, r_{15}$), xor($c_{14}, r_{14}$)).

Note how the logic expressions here are dependent on the received point's location. This is useful because both the complexity of the logical bit operations as well as the number of candidates that get eliminated can be optimized. Note that this act of checking the received point's location and making adjustments is of low complexity because it is done once for the whole set of candidates.

As a further example, if the received point is in region '011' at the three bit level (i.e. right at the periphery) then at the two bit level only points within bit region '01' can be kept because at the three bit level we'll be removing candidates outside of this anyways. The benefit is that roughly ¾ of the candidates are eliminated rather than ½.

Note that the logical bit equations will depend on the numerical representation used for the values. Here a two's complement representation is used which is most common.

Other numerical representations are possible which will dictate the use of different logical bit equations.

It is also possible to incrementally compute the logical bit operations at a given bit level reusing results from the previous bit level. The logical bit operations can be crafted with the knowledge that the remaining candidates passed at the previous bit level and therefore sit within a restricted set of the remaining regions.

As the decoder moves through the process described above from a two-bit comparison to a three-bit comparison (and from a three-bit comparison to a four-bit comparison and so on) the results of the logic equation at the two-bit level may be able to be reused at the three-bit level. In other words, the logic equation at each successive bit level may be computed incrementally from that at the previous level. The incremental computation saves complexity in the following iterations. Whether this is possible or not depends on the logic equations used. One example where this is applicable is when the logic equation checks if the candidate is within the same region as the received point. At the two bit level this corresponds to the equation: and (xnor($c_{15}, r_{15}$), xnor($c_{14}, c_{14}$)).

At the three bit level the equation would be and(and(xnor ($c_{15}, r_{15}$), xnor($c_{14}, r_{14}$)), xnor($c_{13}, r_{13}$)).

Clearly the result of the two bit level expression can be reused at the three bit level, and this process can be repeated at each succeeding bit level with only 1 additional xnor and 1 additional and operation at each bit level.

The examples above are described in only two dimensions, the I and Q dimensions in the complex plane for one receive antenna. This is insufficient for solving the MIMO decoding problem as the decoder needs to find the candidate point with minimum total Euclidean distance across both receive antennas rather than the minimum Euclidean distance for a single receive antenna. It is possible to extend the principles naturally to the MIMO decoder problem by recognizing that the I and Q dimensions of the second receive antenna can be thought of as simply representing additional dimensions (i.e. a third and fourth dimension) of the same points. The problem of finding the candidate with minimum total Euclidean distance is then equivalent to finding the point within the smallest hyper-sphere (rather than a circle) centered at the received point which itself is a point in a four dimensional space.

Consider the equation for the total Euclidean distance squared:

$$d_{m,n}^2 = \|r_1 - c_{1,m,n}\|^2 + \|r_2 - c_{2,m,n}\|^2$$

$$d_{m,n}^2 = (Re\{r_1\} - Re\{c_{1,m,n}\})^2 + (Im\{r_1\} - Im\{c_{1,m,n}\})^2 + (Re\{r_2\} - Re\{c_{2,m,n}\})^2 + (Im\{r_2\} - Im\{c_{2,m,n}\})^2$$

The total Euclidean distance squared can be expressed as the sum of the distances squared in each of the four dimensions (I and Q of each of the two receive antennas) justifying the multi-dimensional interpretation.

The process of MIMO Decoding is therefore to find the candidate points that exist within successively smaller hyper-spheres (rather than simply circles).

Only a small number of MSBs can still be considered for the values and the candidates can still pass or fail in one dimension at a time. This helps reduce the complexity significantly because many candidates will be removed by the time the search proceeds to the I and Q dimensions of the second receive antenna. Also, the use of simple logic operations and reuse of previous computations are still possible in multiple dimensions.

It is possible to also evaluate the candidates one dimension at a time. A number of candidates are eliminated in each dimension reducing the complexity required in succeeding dimensions. The more candidates that can be eliminated at the early stages the better. The number of candidates that get eliminated depends on how broadly distributed the candidate points are across the dimension.

If the dimensions are to be considered one at a time, the multiple dimensions can be evaluated ahead of time to determine an optimal order, the order that reduces the candidates at the fastest rate. The best dimension to start with is the one for which the sum of the absolute value of the corresponding channel estimates from both transmit antennas to the given receive antenna is largest. Considering one dimension at a time can comprise calculating a sum of an absolute value of the channel estimate values from both transmit antennas to the given receive antenna and starting with a dimension for which the sum is the largest.

It is possible to use a minimum number of bits for the computation of the candidates. So far, it was assumed that the candidates were computed in advance at full precision and then the MSBs were extracted from those computed candidate values to do the bit comparisons described above. In fact, the computations to compute the candidate points can be integrated into the comparison process by generating only the number of bits necessary for the candidates in an on-demand fashion. As a further extension of the idea, only the part of the candidate in the first searched dimension (such as the I part for the first receive antenna) needs to be computed. Then only if the point falls within the two-bit region for that dimension does the part of the candidate for the second dimension need to be computed (such as the Q part for the first receive antenna) and so on.

The computation of the candidate points in each dimension is a sum of $N_T$ real numbers:

$$c_{p,m,n} = h_{1,p}\tau_m + h_{2,p}\tau_n$$

$$Re\{c_{p,m,n}\} Re\{h_{1,p}\tau_m\} + Re\{h_{2,p}\tau_n\}$$

$$Im\{c_{p,m,n}\} = Im\{h_{1,p}\tau_m\} + Im\{h_{2,p}\tau_n\}$$

Note that the products of the channel estimate with the individual constellation points (i.e. the terms in the brackets) can be computed in advance and stored with a relatively low level of complexity. Then when a candidate value is needed in one of the dimensions the sum shown here is computed with the necessary number of bits.

The complexity in the standard MLD algorithm is dominated by the Euclidean distance calculations. In the present process 500, the complexity has been reduced by orders of magnitude, therefore, with respect to the complexity, what now dominates is the computation of the candidates.

It is possible to save storage (and enable incremental computation) by keeping track of only the best points. The entire set of candidate points could be considered at the two bit level and only those that pass could be kept. The three bit level can then be proceeded with only those candidates that remain and so on until there is a single point at the end. Alternatively, each candidate point can be considered in turn and first evaluated at the two bit level. If it passes, the process is continued with this candidate and the three bit level is considered, and so on. This process is continued until the bit level at which the candidate is outside of the bounding region is found. This bit level is then compared to the best candidate point so far. If the candidate's bit level matches or exceeds the best candidate so far it is stored in memory. Any time a candidate that exceeds the bit level of the previous candidates is found, the memory of all previous candidates is cleared. After searching through all of the candidates, a set of one or potentially more candidates that are within the smallest hyper-sphere as defined by the bit boundaries is found. The advantage of this approach is two-fold. First, it significantly reduces the need for memory to store the set of candidates that pass the two-bit comparison. Only the set of candidates that are currently the best ones needs to be stored. Second, it eases an implementation where incremental computations are performed as the state of a large number of candidates does not need to be stored. Note that there is no change in the number of computations with this approach.

The process 500 as described should yield performance that is very close to standard MLD performance. There will be some very small performance degradation because, in the bit representation, the squares defined by the bit levels used to eliminate candidates (a) do not represent a perfect circle, and (b) are not centered exactly at the received point.

Figure 10A:
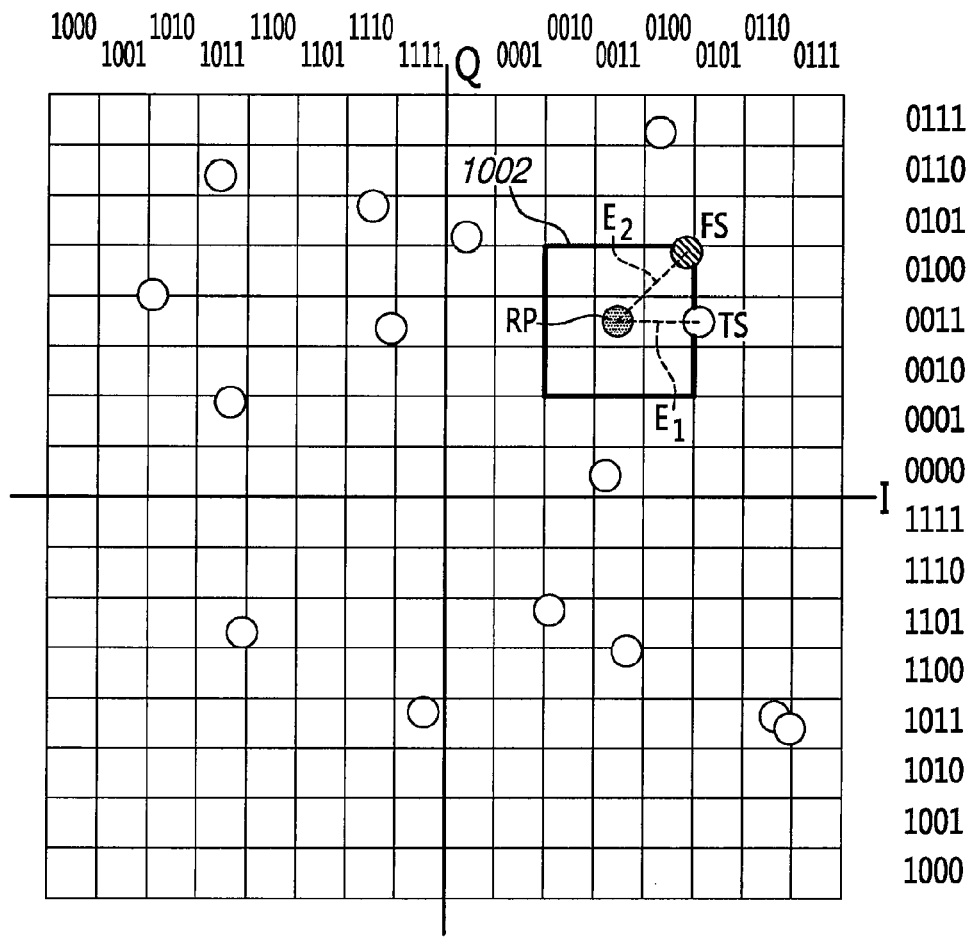
FIG. 10 comprises FIG. 10A, FIG. 10B and FIG. 10C which show performance issues, in FIG. 10A, the issue is a wrong solution due to the approximation of the sphere by a cube, in FIG. 10B, the issue is a wrong solution due to the uncentered location of the received point within the cube
FIG. 10C is a representation of a solution to the issue of FIG. 10B.
Figure 10B:
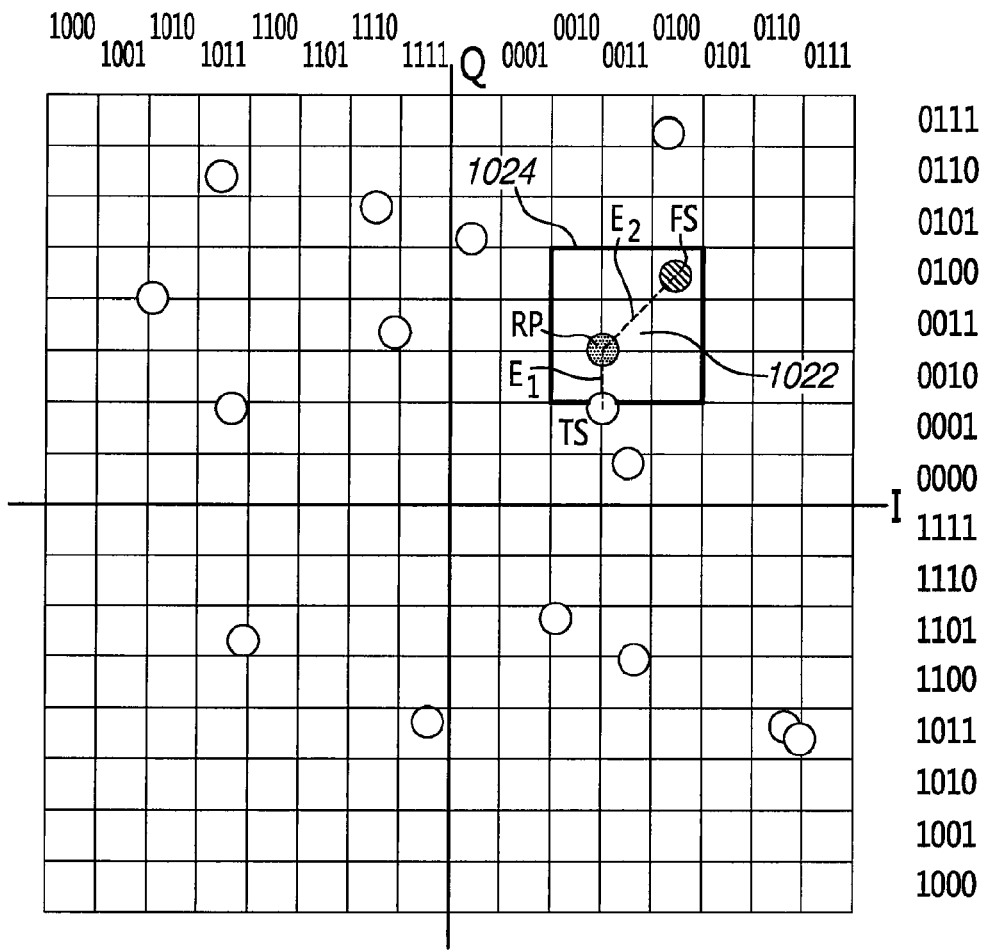

FIG. 10A and FIG. 10B illustrate the two situations where the closest candidate is not selected. Note that these scenarios are only applicable at the last bit level comparison stage. At earlier stages the closest point will not be eliminated.

In FIG. 10A, the true solution TS is eliminated from the possible solutions of the constellation 1000 because it falls outside of the square 1002 at the four bit level. However, its true Euclidean distance E1 to the received point RP is shorter than that E2 of the retained false solution FS. This is caused by the approximation of the circle by a square which includes a corner in which the false solution FS is. One possible solution to this problem is to keep track of those points that have also been eliminated at the second last bit level and to consider those points as well when doing the full Euclidean distance calculation. This will increase complexity slightly but will improve reliability.

In FIG. 10B, the received point is located in the box 1022 at the center of the square 1024. However, it is not located in the center of the box 1022 but rather close to the bottom left-hand side corner of that box 1024. Therefore, the true solution TS is eliminated because it falls outside of the square 1024 at the four bit level. However, its true Euclidean distance E1 to the received point RP is shorter than that E2 of the retained false solution FS.

In that case, the difference between the true TS and false FS solutions can be larger in terms of the Euclidean distance, than in the case illustrated in FIG. 10A. One possible solution is as follows. First, an analysis can be made to determine whether the received point is close to the edge of its square or near the center (for a given bit level). If it is near the edge half a bit can be added (or subtracted) to both the received point and the candidates.

Doing this would yield a situation such as that illustrated in FIG. 10C. With the half-bit addition, the received point RP has moved to the center of the box 1032 within square 1034. The true solution TS has moved to the center of box 1036 and therefore no longer falls outside of the bounding region 1034 and will not be eliminated Distance 1038 is now greater than the distance between the received point RP and the true solution TS.

Note that this addition of a half bit only needs to be done at the last stage of the elimination process and so the number of candidates to which this extra half-bit addition needs to be applied is small. The difficulty is that it is not possible to know that the current stage is the last stage of the processing until all of the points have been processed and it is found that none sit within the current hyper-sphere. To resolve this, the half-bit addition or subtraction can be applied if the received point is not in the center of its square at all of the later bit comparison stages (i.e. starting at an arbitrary bit level such as bit level 4) once the vast majority of the candidates have been removed.

The intent with the half-bit addition or subtraction is to place the received point closer to the center of the square at the current bit level. Therefore if the received point is on the more negative side of center then a half-bit addition is appropriate. If the received point is on the more positive side of side of center then a half-bit subtraction is necessary. Also, note that the half-bit addition or subtraction is on a dimension-by-dimension basis. For instance, a half-bit addition may be used in the I dimension of receive antenna one while a half-bit subtraction may be used in the Q dimension of receive antenna one. Also, note that the half bit addition or subtraction is only performed if the received point is more than a quarter of a bit away from the center.

Figure 11:
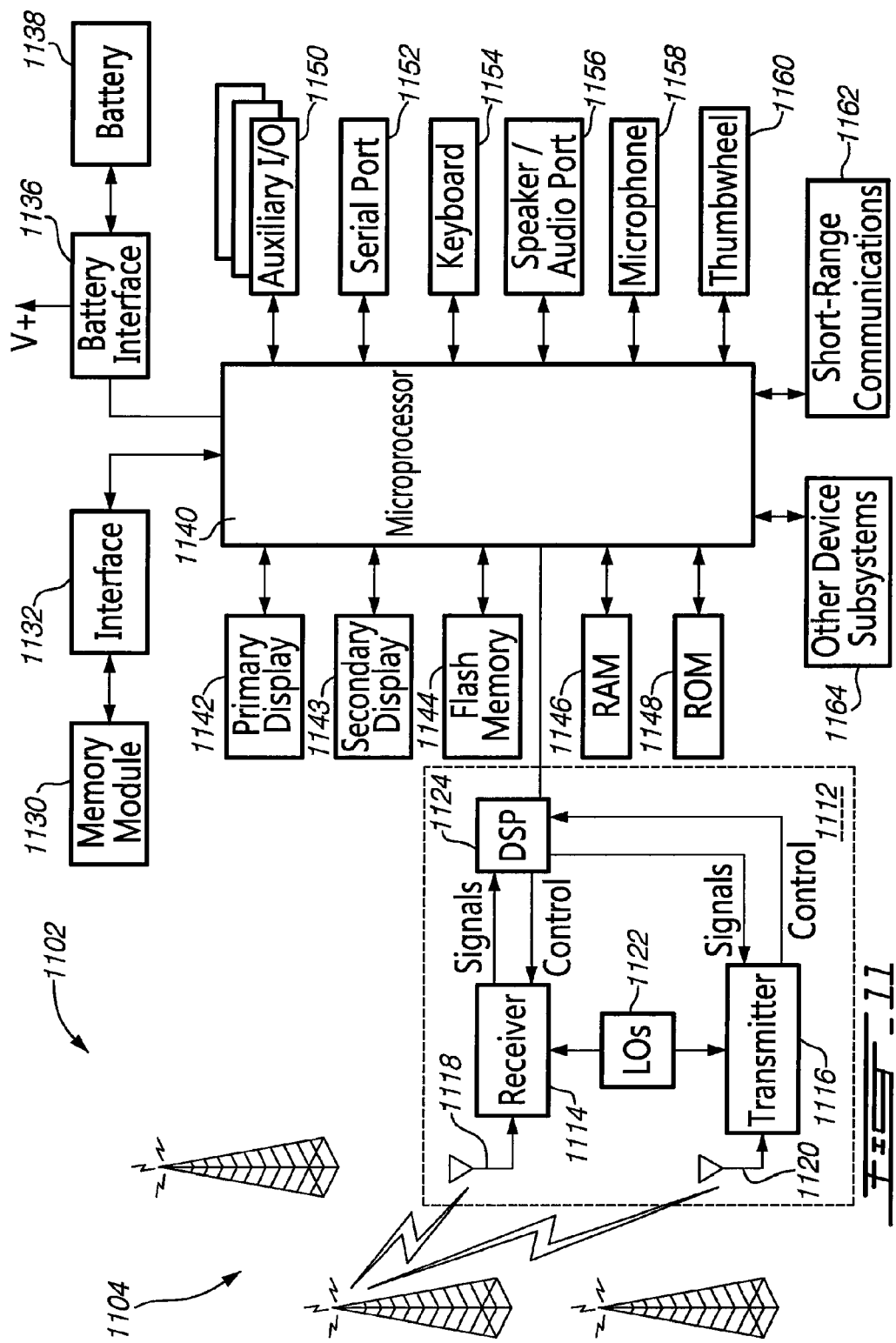
FIG. 11 is a block diagram of a wireless device which can incorporate MIMO Decoding processes.

Process 500 is applicable to various types of devices, such as wireless devices. Reference is made to FIG. 11, which shows a block diagram illustrating a wireless device 1102 in accordance with an embodiment of the present disclosure. The wireless device 1102 communicates through a wireless communication network 1104. The wireless network 1104 includes antennae, base stations, and supporting radio equipment as for supporting wireless communications between the wireless device 1102 and other devices connected to wireless network 1104. The wireless network 1104 may be coupled to a wireless network gateway and to a wide area network, shown in FIG. 12.

In an embodiment, the wireless device 1102 is a two-way mobile communication device having at least voice and data communication capabilities, including the capability to communicate with other computer systems. Depending on the functionality provided by the wireless device 1102, it may be referred to as a data messaging device, a two-way pager, a cellular telephone with data messaging capabilities, a wireless Internet appliance, a data communication device (with or without telephony capabilities), a clamshell device, or a flip-phone. The wireless device 1102 may communicate with any one of a plurality of fixed transceiver stations within its geographic coverage area.

The wireless device 1102 may incorporate a communication subsystem 1112, which includes a receiver 1114, a transmitter 1116, and associated components, such as one or more antenna elements 1118 and 1120, local oscillators (LOs) 1122, and a processing module such as a digital signal processor (DSP) 1124. In an embodiment, the antenna elements 1118 and 1120 may be embedded or internal to the wireless device 1102. As will be apparent to those skilled in the field of communications, the particular design of the communication subsystem 1112 depends on the wireless network 1104 in which the wireless device 1102 is intended to operate. Since process 500 is for a MIMO decoder, the wireless device 1102 includes at least two receiver antennas 1118 and at least two transmitter antennas 1120 are to be used with process 500.

The wireless device 1102 may send and receive communication signals over the wireless network 1104 after the required network registration or activation procedures have been completed. Signals received by at least two receiver antennas 1118 through the wireless network 1104 are input to the receiver 1114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 1124. The DSP 1124 includes appropriate components to perform the MIMO decoding process 500. In a similar manner, signals to be transmitted are processed, including modulation and encoding, for example, by the DSP 1124. These DSP-processed signals are input to the transmitter 1116 for digital-to-analog (D/A) conversion, frequency up conversion, filtering, amplification, and transmission to the wireless network 1104 via the two or more transmitter antennas 1120. The DSP 1124 not only processes communication signals, but also provides for receiver and transmitter control. For example, the gains applied to communication signals in the receiver 1114 and the transmitter 1116 may be adaptively controlled through automatic gain control algorithms implemented in the DSP 1124.

Network access is associated with a subscriber or user of the wireless device 1102 via a memory module, such as a memory module 1130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 1132 of the wireless device 1102 in order to operate in conjunction with the wireless network 1104. Alternatively, the wireless device 1102 may have an integrated identity module for use with systems such as Code Division Multiple Access (CDMA) systems.

The wireless device 1102 also includes a battery interface 1136 for receiving one or more rechargeable batteries 1138. The battery 1138 provides electrical power to at least some of the electrical circuitry in the wireless device 1102, and the battery interface 1136 provides a mechanical and electrical connection for the battery 1138. The battery interface 1136 is coupled to a regulator (not shown) which provides power V+ to the circuitry of the wireless device 1102.

The wireless device 1102 includes a microprocessor 1140 which controls the overall operation of the wireless device 1102. Communication functions, including at least data and voice communications, are performed through the communication subsystem 1112. The microprocessor 1140 also interacts with additional device subsystems such as a primary display 1142, a secondary display 1143, a flash memory 1144, a random access memory (RAM) 1146, a read-only memory (ROM) 1148, auxiliary input/output (I/O) subsystems 1150, a data port such as serial port 1152, a keyboard or keypad 1154, a speaker or audio port 1156 for connecting to, for example a set of headphones or an earpiece, a microphone 1158, a clickable thumbwheel or thumbwheel 1160, a short-range communications subsystem 1162, and any other device subsystems generally designated as 1164. Some of the subsystems shown in FIG. 11 perform communication-related functions, whereas other subsystems may provide "resident" or on-device functions. Notably, some subsystems, such as the keypad 1154, the primary display 1142, the secondary display 1143, and the clickable thumbwheel 1160, for example, may be used for both communication-related functions, such as displaying notifications or entering a text message for transmission over the wireless network 1104, and executing device-resident functions such as a clock, a calculator or a task list. Operating system software used by the microprocessor 1140 can be stored in a persistent store such as the flash memory 1144, which may alternatively be the ROM 1148 or similar storage element. Those skilled in the art will appreciate that the operating system, specific device applications, or parts thereof, may be temporarily loaded into a volatile store such as the RAM 1146.

The microprocessor 1140, in addition to its operating system functions, enables execution of software applications on the wireless device 1102. A predetermined set of applications that control basic device operations, including data and voice communication applications, will normally be installed on the wireless device 1102 during or after manufacture. The wireless device 1102 may include a personal information manager (PIM) application having the ability to organize and manage data items relating to a user such as, but not limited to, instant messaging, email, calendar events, voice mails, appointments, and task items. One or more memory stores may be available on the wireless device 1102 to facilitate storage of information, such as the flash memory 1144, the RAM 1146, the ROM 1148, the memory module 1130, or other types of memory storage devices or FLASH memory cards represented by the other device subsystems 1164, such as Secure Digital (SD) cards or mini SD cards, etc.

The PIM or media applications or both have the ability to send and receive data items via either the wireless network 1104 or a link to a computer system. The link to the computer system may be via the serial port 1152 or the short-range communications subsystem 1162. In an embodiment, PIM or media data items or both are seamlessly combined, synchronized, and updated via the wireless network 1104, with the wireless device user's corresponding data items stored or associated or both with a host computer system thereby creating a mirrored or partially mirrored host computer on the wireless device 1102 with respect to such items. This may be advantageous where the host computer system is the wireless device user's office computer system. Additional applications, including upgrades to the ROM 1148, may also be loaded onto the wireless device 1102 through the wireless network 1104, the auxiliary I/O subsystem 1150, the serial port 1152, the short-range communications subsystem 1162, or any other suitable subsystem 1164, and installed by a user in the RAM 1146 or a non-volatile store such as the ROM 1148 for execution by the microprocessor 1140. Such flexibility in application installation increases the functionality of the wireless device 1102 and may provide enhanced on-device functions, communication-related functions, or both. For example, secure communication applications may enable electronic commerce functions and other such financial transactions to be performed using the wireless device 1102.

In a data communication mode, a received data signal representing information such as a text message, an email message, a media file to be transferred, or Web page download will be processed by the communication subsystem 1112 and input to the microprocessor 1140. The microprocessor 1140 will further process the signal for output to the primary display 1142, secondary display 1143, or alternatively to the auxiliary I/O device 1150. A user of the wireless device 1102 may also compose data items, such as email messages, for example, using the keypad 1154 or the clickable thumbwheel 1160 or both in conjunction with the primary display 1142 and possibly the auxiliary I/O device 1150. The keypad 1154 may be either a complete alphanumeric keypad or telephone-type keypad. These composed items may be transmitted through the communication subsystem 1112 over the wireless network 1104 or via the short range communication subsystem 1162.

For voice communications, the overall operation of the wireless device 1102 is similar, except that the received signals would be output to the speaker or audio port 1156 and signals for transmission would be generated by a transducer such as the microphone 1158. Alternative voice or audio I/O subsystems, such as a voice message recording subsystem, may also be implemented on the wireless device 1102. Although voice or audio signal output is typically accomplished primarily through the speaker or audio port 1156, the primary display 1142 or the secondary display 1143 may also be used to provide an indication of the identity of a calling party, duration of a voice call, or other voice call related information. Stereo headphones or an earpiece may also be used in place of the speaker 1156.

The serial port 1152 is normally implemented in a personal digital assistant (PDA) type communication device for which synchronization with a user's computer is a desirable, albeit optional, component. The serial port 1152 enables a user to set preferences through an external device or software application and extends the capabilities of the wireless device 1102 by providing for information or software downloads to the wireless device 1102 other than through the wireless network 1104. The alternate download path may, for example, be used to load software or data files onto the wireless device 1102 through a direct, reliable and trusted connection.

The short-range communications subsystem 1162 is an additional optional component which provides for communication between the wireless device 1102 and different systems or devices, which need not necessarily be similar devices. For example, the subsystem 1162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 1162 may be a wireless networking communications subsystem, conforming to IEEE 802.11 standards such as one or more of 802.11b, 802.11g, or 802.11n.

One embodiment of the wireless device can therefore comprise a processor for controlling operation of the wireless device; a first input device coupled to the processor for accepting an input; at least one display device coupled to the processor for communicating an output to the user; a communications subsystem coupled to the processor for communicating with a communications network; a memory coupled to the processor; and a storage device coupled to the processor; the communications subsystem including a MIMO decoding module for decoding transmitted symbols.

Reference is next made to FIG. 12, which shows a communication system 1200 suitable for use with the wireless device 1102 shown in FIG. 11. The communication system 1200 generally includes one or more wireless devices 1102 (only one of which is shown in FIG. 12) and the wireless network 1104. The wireless network 1104 may include a wireless Wide Area Network (WAN) 1202, a Wireless Local Area Network (WLAN) 1204, or other interfaces 1206 (which may not necessarily be wireless) or both.

The wireless WAN 1202 may be implemented as a packet-based cellular or mobile network that includes a number of base stations 1208 (one of which is shown in FIG. 12) where each of the base stations 1208 provides wireless Radio Frequency (RF) coverage to a corresponding area or cell. The wireless WAN 1202 is typically operated by a cellular network service provider that sells subscription packages to users of the wireless devices 1102. The wireless WAN 1202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), DEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO), WiMAX (Worldwide Interoperability for Microwave Access), etc. Currently, only UMTS release 7, 8 and beyond and WiMAX support MIMO systems. However, any network supporting MIMO systems can be used with the present system and method.

As shown in FIG. 12, the communications system 1200 also includes a wireless network gateway 1210 and one or more network provider systems 1212. The wireless network gateway 1210 provides translation and routing services between the network provider system(s) 1212 and the WAN 1202, which facilitates communication between the wireless devices 1102 and other devices (not shown) connected, directly or indirectly, to the network provider system 1212.

The WLAN 1204 comprises a network which in some examples conforms to IEEE 802.11 standards such as one or more of 802.11b, 802.11g, or 802.11n; however, other communications protocols may also be used for the WLAN 1204. The WLAN 1204 includes one or more wireless RF Access Points (AP) 1214 (one of which is shown in FIG. 12) that collectively provide a WLAN coverage area. For the embodiment depicted in FIG. 12, the WLAN 1204 is operated by an enterprise (for example, a business or university in a building or campus type environment) and the access points 1214 are connected to an access point (AP) interface 1216. The AP interface 1216 provides translation and routing services between the access points 1214 and the network provider system 1212 to facilitate communication between two or more of the wireless devices 1102 and other devices (e.g., such as desktop computers) connected, directly or indirectly, to the network provider system 1212. The AP interface 1216 is implemented using a computer, for example, a server running a suitable computer program or software.

According to an embodiment, the other interfaces 1206 may be implemented using a physical interface indicated by reference 1218. The physical interface 1218 includes an Ethernet, Universal Serial Bus (USB), Firewire, or infrared (IR) connection implemented to exchange information between the network provider system 1212 and the wireless device 1102.

The network provider system 1212 comprises a server or server modules or a number of servers or server modules which are typically located behind a firewall (not shown). The network provider system 1212 may include a number of modules including a mobile data delivery module 1220. Various modules running on the network provider system 1212 may be implemented as a number of services running on a single server or as a number of interconnected servers each running a software program to implement the functionality of the respective module. The network provider system 1212 provides access for the wireless devices 1102, through either the wireless WAN 1202, the WLAN 1204, or the other connection 1206 to the devices connected, for example, through an enterprise network 1224 (e.g., an intranet), to the network provider system 1212. In an embodiment, the data delivery module 1220 is implemented on a computer, such as the network provider system 1212.

The enterprise network 1224 comprises a local area network, an intranet, the Internet, a direct connection, or combinations thereof. The enterprise network 1224 may comprise an intranet for a corporation or other type of organization. In at least some embodiments, the network provider system 1212 is part of the enterprise network 1224, and is located behind a corporate firewall and connected to the wireless network gateway 1210 through the Internet. A computer 1222 (e.g., a desktop or laptop computer) belonging to the user of the wireless device 1102 is typically connected to the enterprise network 1224. As described earlier, the wireless device 102 can be temporarily and directly connected to the computer 1222 using, for example, the serial port 1152. Alternatively, the wireless device 1102 may communicate with the computer 1222 using the communication subsystem 1112 and the WAN 1202 or the short-range communications subsystem 1162 or both and the WLAN 1204.

As shown in FIG. 12, an application/content server 1226 may be connected to the enterprise network 1224 and also to another network, for example a Wide Area Network (WAN) 1228. In some embodiments, an email server 1232 or the content server 1226 or both form part of the enterprise network 1224. The WAN 1228 may further connect to other networks. The WAN 1228 may comprise or be configured with the Internet, a direct connection, a LAN, a wireless communication link, or any combination thereof. Content providers, such as Web servers, may be connected to the WAN 1228, an example of which is shown in FIG. 12 as an origin server 1230.

According to an embodiment, the mobile data delivery module 1220 provides connectivity between the wireless WAN 1202 and the WLAN 1204 and the other connection 1206 and devices or networks or both connected directly or indirectly to the network provider system 1212. In an embodiment, the connectivity provided may be Hypertext Transfer Protocol (HTTP) based connectivity providing an Internet based service connection to devices connected to the wireless WAN 1202, the WLAN 1204, or the other connection 1206 and devices or networks or both connected directly or indirectly to the network provider system 1212. The network 1224, the application/content server 1226, the WAN 1228, and the origin server 1230, are individually or collectively or both in various combinations a content source for the network provider system 1212. It will be appreciated that the system shown in FIG. 12 comprises but one possible communication network or configuration of a multitude of possible configurations for use with the wireless devices 1102.

It will be appreciated that a computer program product having a computer readable medium could tangibly embody code for performing the acts of process 500. Similarly, multiple hardware components could each tangibly embody code for performing some steps of process 500 and, and when used in combination, would perform the whole process 500 or some portion of it.

While the blocks of the methods and the systems in FIGS. 1, 5, 8, 11 and 12 are shown as occurring in a particular order, it will be appreciated by those skilled in the art that many of the blocks are interchangeable and may occur in different orders than that shown without materially affecting the end results of the methods and systems.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for decoding received data, the received data comprising in-phase data and quadrature data and the received data including a combination of data transmitted by multiple transmit antennas, the method comprising:
   (a) defining a bounded region based on a number of most significant bits for the in-phase and the quadrature received data, the number of most significant bits being less than or equal to a total number of bits for each of the in-phase and the quadrature received data;
   (b) calculating possible candidates to the same number of most significant bits of the received data used to define the bounded region;
   (c) storing the calculated most significant bits of any possible candidates considered to be inside the bounded region and discarding any candidates considered to be outside the bounded region;
   (d) increasing the number of most significant bits for the in-phase and the quadrature received data;
   (e) repeating (a) to (d) until no more than one candidate remains, wherein (a) is repeated using the increased number of most significant bits and (b) is repeated using only the stored most significant bits of possible candidates;
   (f) when less than one candidate remains, calculating all the bits for each remaining candidate of an immediately previous iteration and selecting the candidate having a closest Euclidean distance to the received data to obtain one remaining candidate; and
   (g) outputting signals representing an identifier of the one remaining candidate.

2. The method according to claim 1, wherein the received data is received using multiple receive antennas and (a) to (d) are repeated for each receive antenna.

3. The method according to claim 1, wherein the bounded region is a region surrounding the received data.

4. A method for decoding received data, the received data comprising in-phase data and quadrature data and the received data including a combination of data transmitted by multiple transmit antennas, the method comprising:
   (a) defining a bounded region based on a number of most significant bits for the in-phase and the quadrature received data, the number of most significant bits being less than or equal to a total number of bits for each of the in-phase and the quadrature received data;
   (b) calculating a current possible candidate to the same number of most significant bits of the received data used to define the bounded region;
   (c) when the current possible candidate is considered to be inside the bounded region, repeating (a) and (b) until the current possible candidate is considered to be outside the bounded region, wherein in (a) the number of most significant bits for the in-phase and the quadrature received data is increased and another bounded region smaller than the first bounded region is defined using the increased number of significant bits and in (b) the current possible candidate is calculated to the same number of most significant bits as the increased number of most significant bits for the in-phase and the quadrature received data;
   (d) when the current possible candidate is considered to be outside the bounded region, storing an identifier and the most significant bits of the current possible candidate;
   (e) if no previous possible candidate has been stored, storing the current possible candidate, or if at least one previous possible candidate has been stored, comparing the number most significant bits of the current possible candidate with the number of most significant bits of the stored previous possible candidate, and discarding the candidate with the lesser number of most significant bits, or additionally storing the current candidate if the number of most significant bits is the same;
   (f) repeating (a) to (e) with all possible candidates until only one possible candidate remains or if more than one candidate remains, calculating all the bits for each remaining candidate and selecting the candidate having a closest Euclidean distance to the received data to obtain one remaining candidate; and
   (g) outputting signals representing an identifier of the one remaining candidate.

5. The method according to claim 4, wherein the received data is received using multiple receive antennas and (a) to (e) are repeated for each receive antenna.

6. The method according to claim 4, wherein the bounded region is a region surrounding the received data.

7. A wireless device comprising:
   a processor for controlling operation of the wireless device; and
   a communications subsystem coupled to the processor for communicating with a communications network and for receiving data comprising in-phase data and quadrature data, the received data including a combination of data transmitted by multiple transmit antennas;
   the processor being configured to implement a MIMO decoding module comprising instructions to cause the device to:
   (a) define a bounded region based on a number of most significant bits for the in-phase and the quadrature received data, the number of most significant bits being less than or equal to a total number of bits for each of the in-phase and the quadrature received data;
   (b) calculate possible candidates to the same number of most significant bits of the received data used to define the bounded region;
   (c) store the calculated most significant bits of any possible candidates considered to be inside the bounded region and discard any candidates considered to be outside the bounded region;
   (d) increase the number of most significant bits for the in-phase and the quadrature received data;
   (e) repeat (a) to (d) until no more than one candidate remains, wherein (a) is repeated using the increased number of most significant bits and (b) is repeated using only the stored most significant bits of possible candidates;
   (f) when less than one candidate remains, calculate all the bits for each remaining candidate of an immediately previous iteration and select the candidate having a closest Euclidean distance to the received data to obtain one remaining candidate; and
   (g) output signals representing an identifier of the one remaining candidate.

8. The device according to claim 7, wherein the received data is received using multiple receive antennas and (a) to (d) are repeated for each receive antenna.

9. The device according to claim 7, wherein the bounded region is a region surrounding the received data.

10. A wireless device comprising:
a processor for controlling operation of the wireless device; and
a communications subsystem coupled to the processor for communicating with a communications network and for receiving data comprising in-phase data and quadrature data, the received data including a combination of data transmitted by multiple transmit antennas;
the processor being configured to implement a MIMO decoding module comprising instructions to cause the device to:
(a) define a bounded region based on a number of most significant bits for the in-phase and the quadrature received data, the number of most significant bits being less than or equal to a total number of bits for each of the in-phase and the quadrature received data;
(b) calculate a current possible candidate to the same number of most significant bits of the received data used to define the bounded region;
(c) when the current possible candidate is considered to be inside the bounded region, repeat (a) and (b) until the current possible candidate is considered to be outside the bounded region, wherein in (a) the number of most significant bits for the in-phase and the quadrature received data is increased and another bounded region smaller than the first bounded region is defined using the increased number of significant bits and in (b) the current possible candidate is calculated to the same number of most significant bits as the increased number of most significant bits for the in-phase and the quadrature received data;
(d) when the current possible candidate is considered to be outside the bounded region, store an identifier and the most significant bits of the current possible candidate;
(e) if no previous possible candidate has been stored, store the current possible candidate, or if at least one previous possible candidate has been stored, compare the number most significant bits of the current possible candidate with the number of most significant bits of the stored previous possible candidate, and discard the candidate with the lesser number of most significant bits, or additionally store the current candidate if the number of most significant bits is the same;
(f) repeat (a) to (e) with all possible candidates until only one possible candidate remains or if more than one candidate remains, calculate all the bits for each remaining candidate and select the candidate having a closest Euclidean distance to the received data to obtain one remaining candidate; and
(g) output signals representing an identifier of the one remaining candidate.

11. The device according to claim 10, wherein the received data is received using multiple receive antennas and (a) to (e) are repeated for each receive antenna.

12. The device according to claim 10, wherein the bounded region is a region surrounding the received data.

13. A non-transitory computer program product comprising a computer readable medium tangibly embodying code executable by a processor to, after receiving data comprising in-phase data and quadrature data, the received data including a combination of data transmitted by multiple transmit antennas:
(a) define a bounded region based on a number of most significant bits for the in-phase and the quadrature received data, the number of most significant bits being less than or equal to a total number of bits for each of the in-phase and the quadrature received data;
(b) calculate possible candidates to the same number of most significant bits of the received data used to define the bounded region;
(c) store the calculated most significant bits of any possible candidates considered to be inside the bounded region and discard any candidates considered to be outside the bounded region;
(d) increase the number of most significant bits for the in-phase and the quadrature received data;
(e) repeat (a) to (d) until no more than one candidate remains, wherein (a) is repeated using the increased number of most significant bits and (b) is repeated using only the stored most significant bits of possible candidates;
(f) when less than one candidate remains, calculate all the bits for each remaining candidate of an immediately previous iteration and select the candidate having a closest Euclidean distance to the received data to obtain one remaining candidate; and
(g) output signals representing an identifier of the one remaining candidate.

14. The non-transitory computer program product according to claim 13, wherein the received data is received using multiple receive antennas and (a) to (d) are repeated for each receive antenna.

15. The non-transitory computer program product according to claim 13, wherein the bounded region is a region surrounding the received data.

16. A non-transitory computer program product comprising a computer readable medium tangibly embodying code executable by a processor to, after receiving data comprising in-phase data and quadrature data, the received data including a combination of data transmitted by multiple transmit antennas:
(a) define a bounded region based on a number of most significant bits for the in-phase and the quadrature received data, the number of most significant bits being less than or equal to a total number of bits for each of the in-phase and the quadrature received data;
(b) calculate a current possible candidate to the same number of most significant bits of the received data used to define the bounded region;
(c) when the current possible candidate is considered to be inside the bounded region, repeat (a) and (b) until the current possible candidate is considered to be outside the bounded region, wherein in (a) the number of most significant bits for the in-phase and the quadrature received data is increased and another bounded region smaller than the first bounded region is defined using the increased number of significant bits and in (b) the current possible candidate is calculated to the same number of most significant bits as the increased number of most significant bits for the in-phase and the quadrature received data;
(d) when the current possible candidate is considered to be outside the bounded region, store an identifier and the most significant bits of the current possible candidate;
(e) if no previous possible candidate has been stored, store the current possible candidate, or if at least one previous possible candidate has been stored, compare the number most significant bits of the current possible candidate with the number of most significant bits of the stored previous possible candidate, and discard the candidate with the lesser number of most significant bits, or additionally store the current candidate if the number of most significant bits is the same;

(f) repeat (a) to (e) with all possible candidates until only one possible candidate remains or if more than one candidate remains, calculate all the bits for each remaining candidate and select the candidate having a closest Euclidean distance to the received data to obtain one remaining candidate; and (g) output signals representing an identifier of the one remaining candidate.

17. The non-transitory computer program product according to claim 16, wherein the received data is received using multiple receive antennas and (a) to (e) are repeated for each receive antenna.

18. The non-transitory computer program product according to claim 16, wherein the bounded region is a region surrounding the received data.

* * * * *